(12) United States Patent
Patel et al.

(10) Patent No.: US 11,169,977 B2
(45) Date of Patent: Nov. 9, 2021

(54) SYSTEM AND METHOD FOR REMOVAL OF DATA AND METADATA USING AN ENUMERATOR

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 16/588,684

(22) Filed: Sep. 30, 2019

(65) Prior Publication Data

US 2021/0097041 A1  Apr. 1, 2021

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
None
See application file for complete search history.

(56) References Cited

U.S. PATENT DOCUMENTS

| 7,970,743 B1* | 6/2011 | Kilday | G06Q 30/0603 |
| | | | 707/689 |
| 2019/0164094 A1* | 5/2019 | Ferranti | G06Q 10/0635 |

* cited by examiner

*Primary Examiner* — Bai D Vu
(74) *Attorney, Agent, or Firm* — Chamberlain, Hrdlicka, White, Williams & Aughtry

(57) ABSTRACT

A data storage system includes a first region, a second region, and a global enumerator. The first region stores a first copy of data. The second region stores a second copy of the data. The global enumerator performs a data control analysis of the data to identify that the first region is a high regulation region and the second region is a low regulation region; in response to making the identification: updates first metadata associated with the first copy of the data to regulate access to the first copy of the data; and updates second metadata associated with the second copy of the data to deregulate access to the second copy of the data.

20 Claims, 20 Drawing Sheets

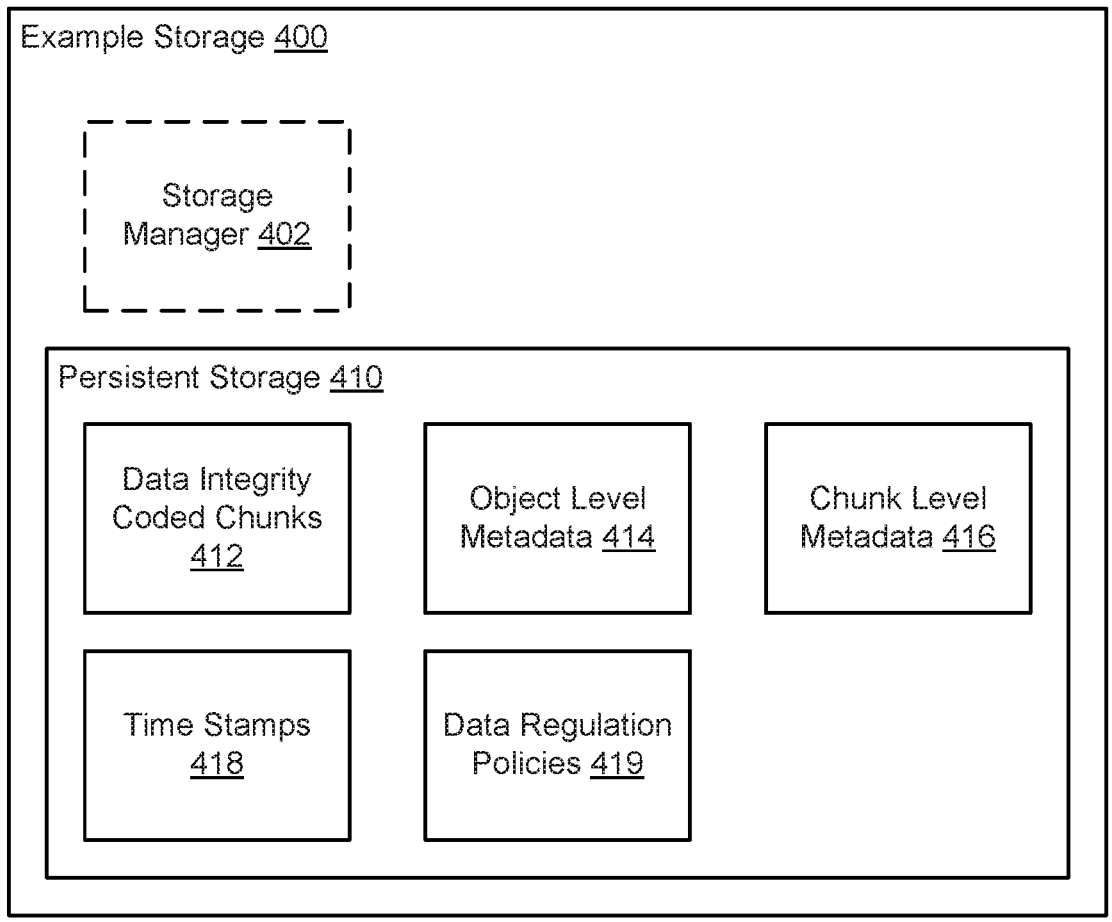
FIG. 4.1
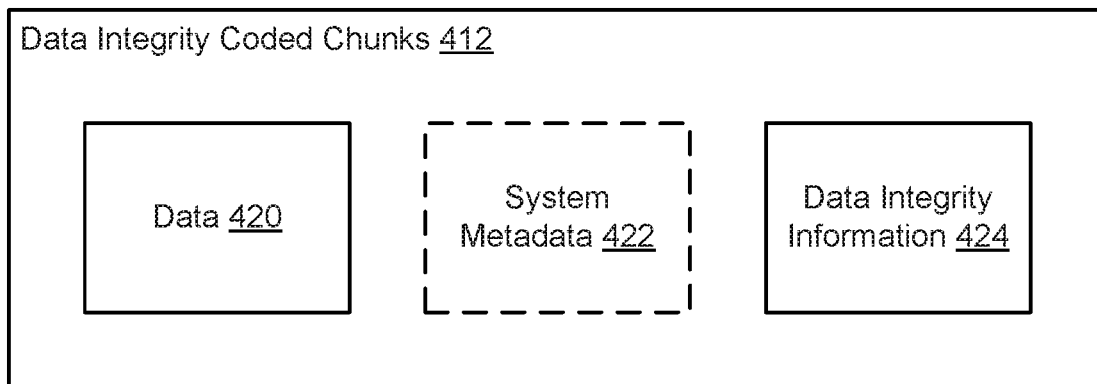
FIG. 4.2

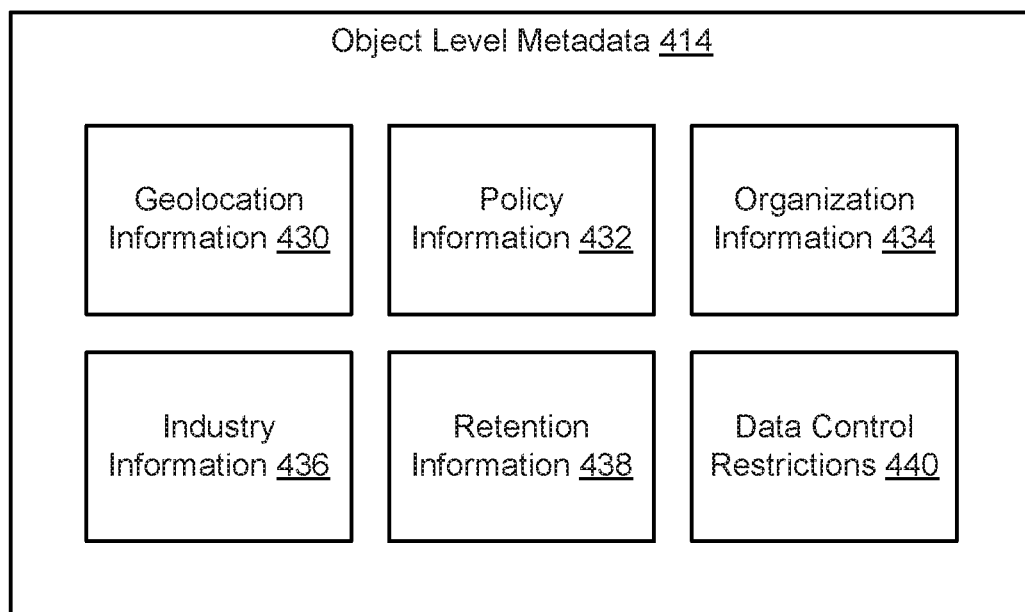
FIG. 4.3

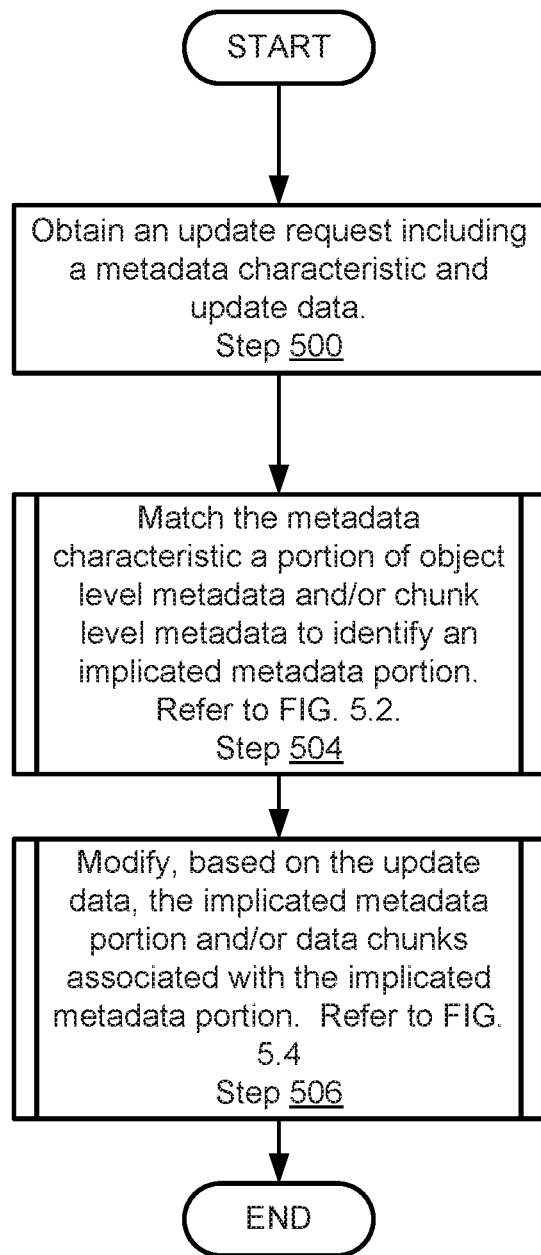
FIG. 5.1

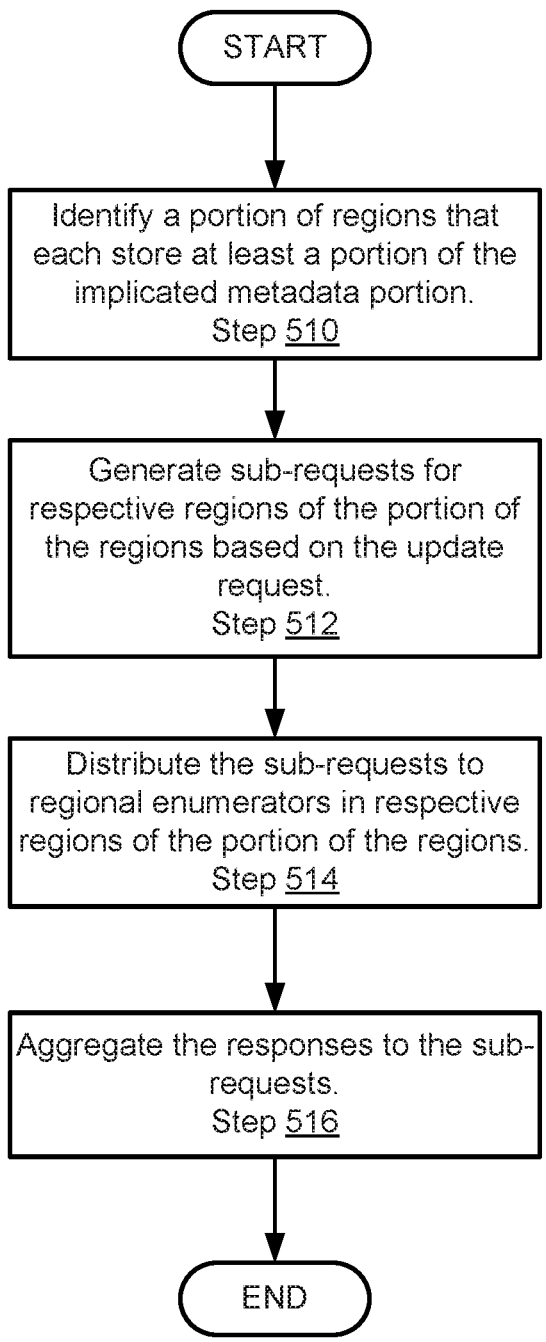
FIG. 5.2

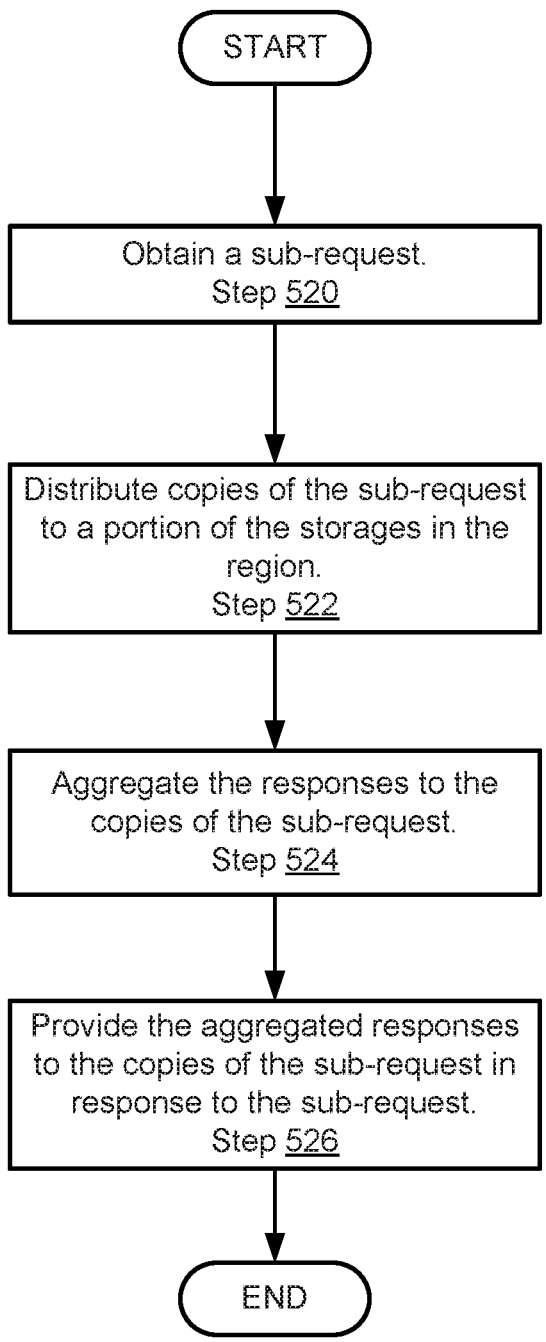
FIG. 5.3

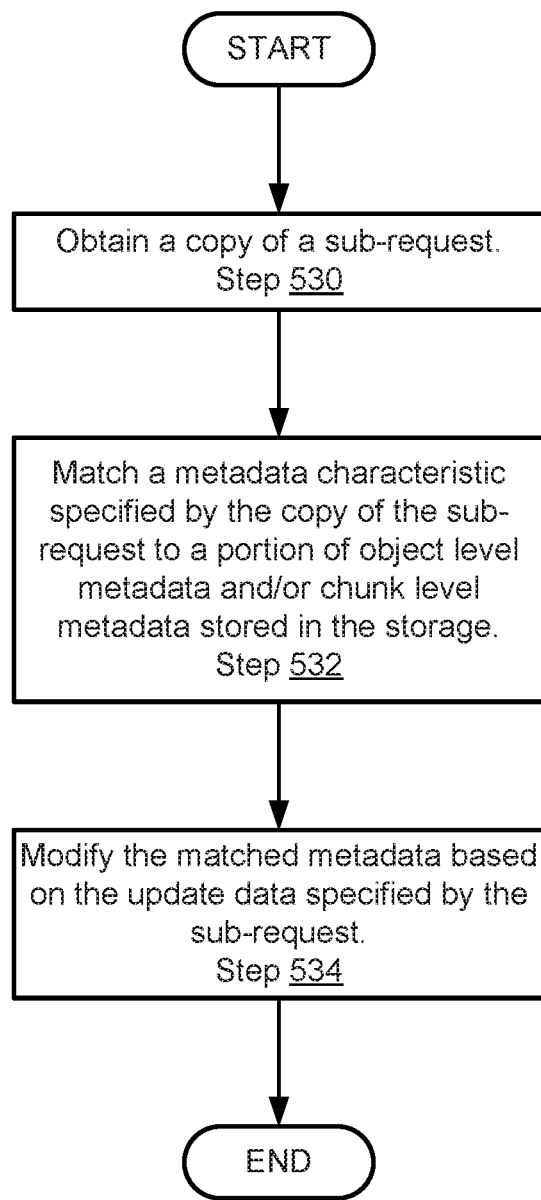
FIG. 5.4

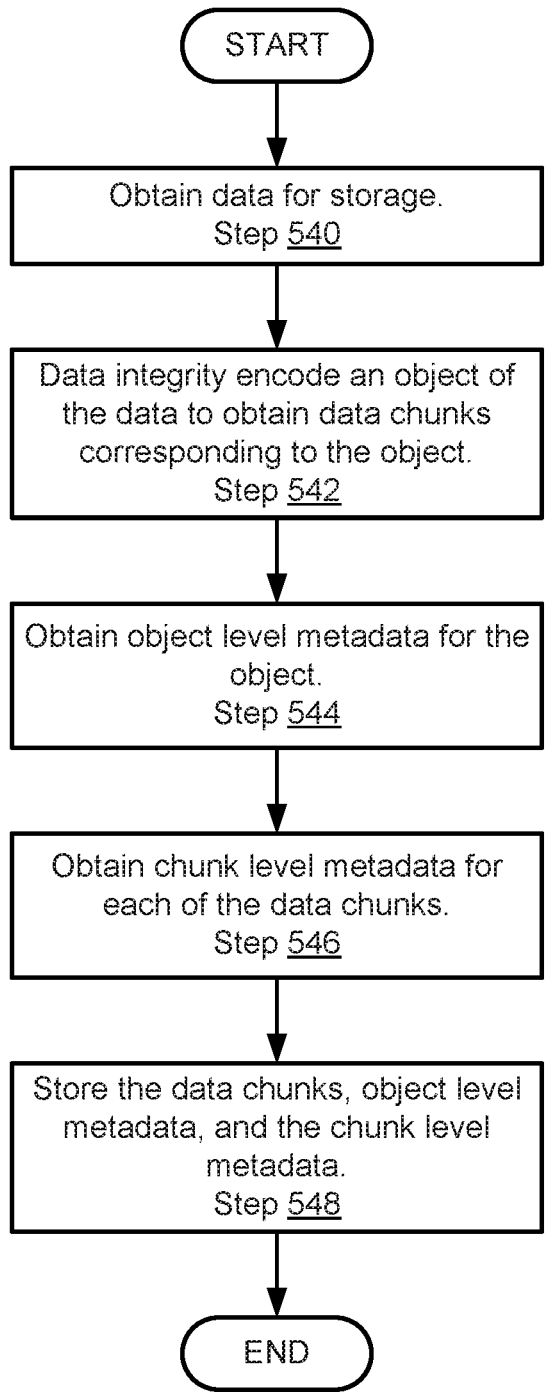
FIG. 5.5

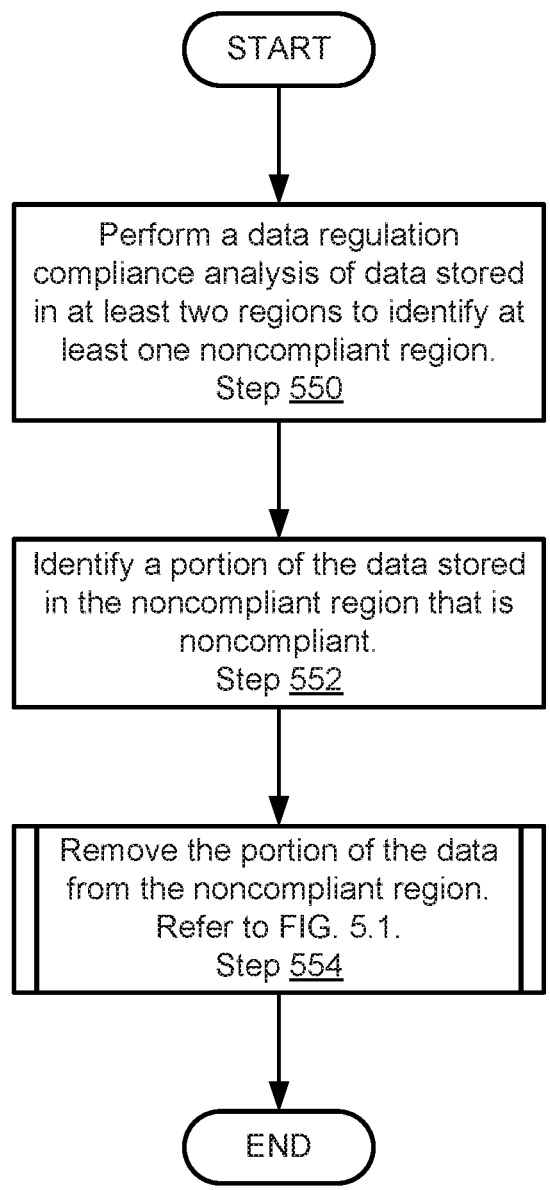
FIG. 5.6

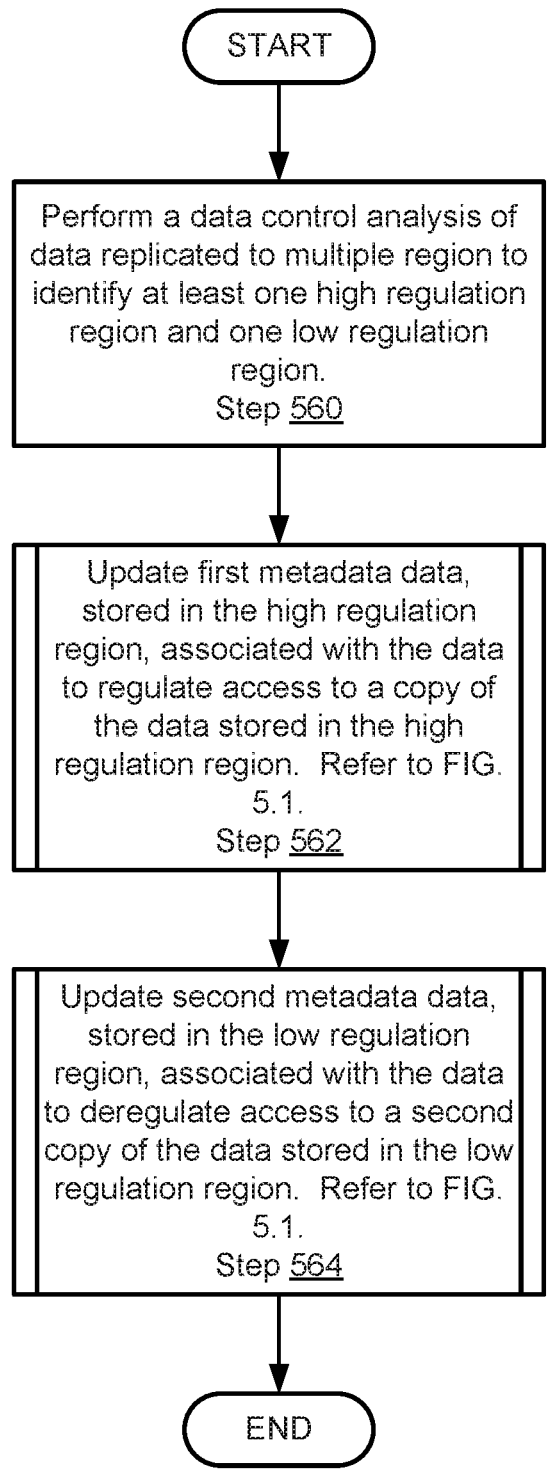
FIG. 5.7

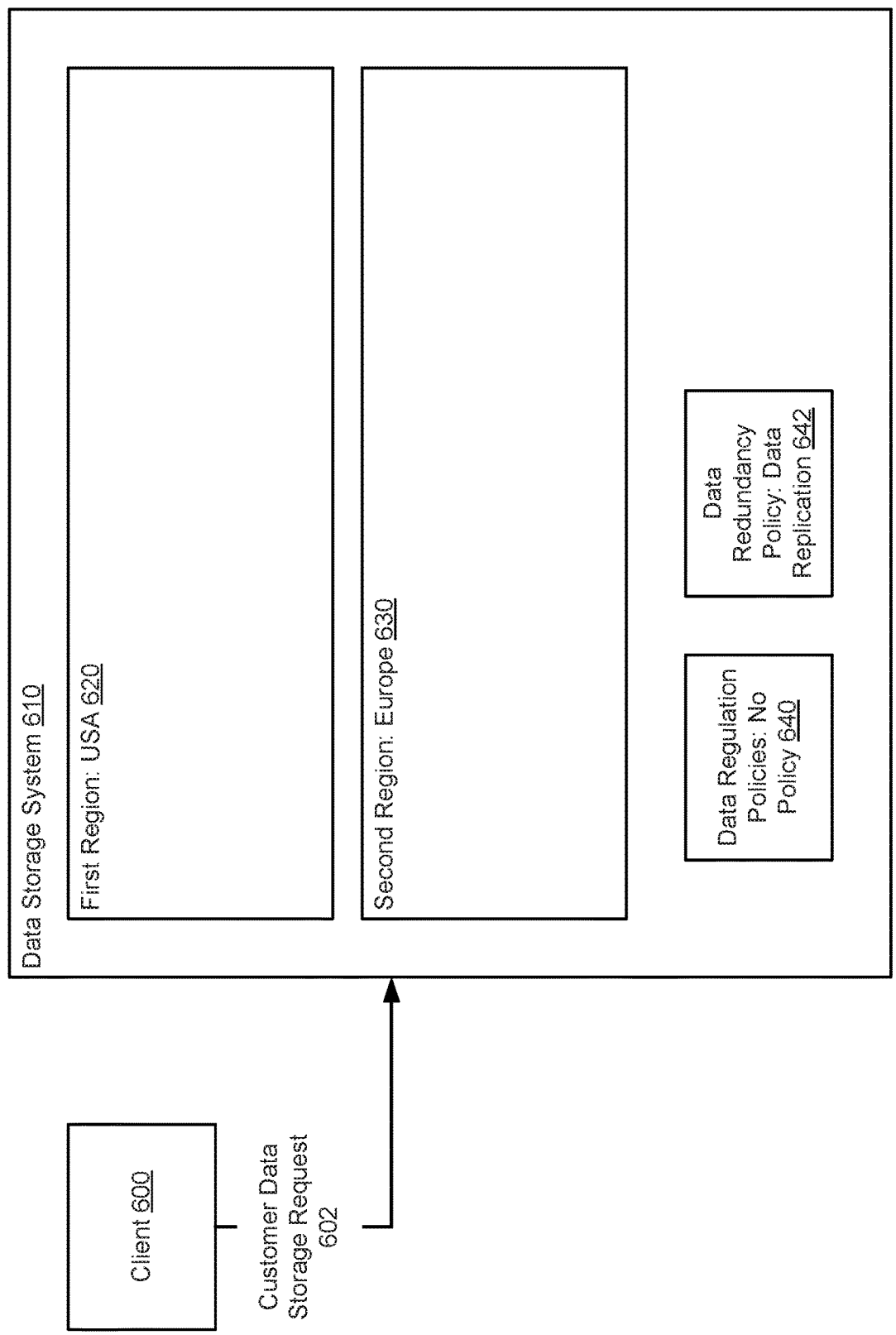
FIG. 6.1

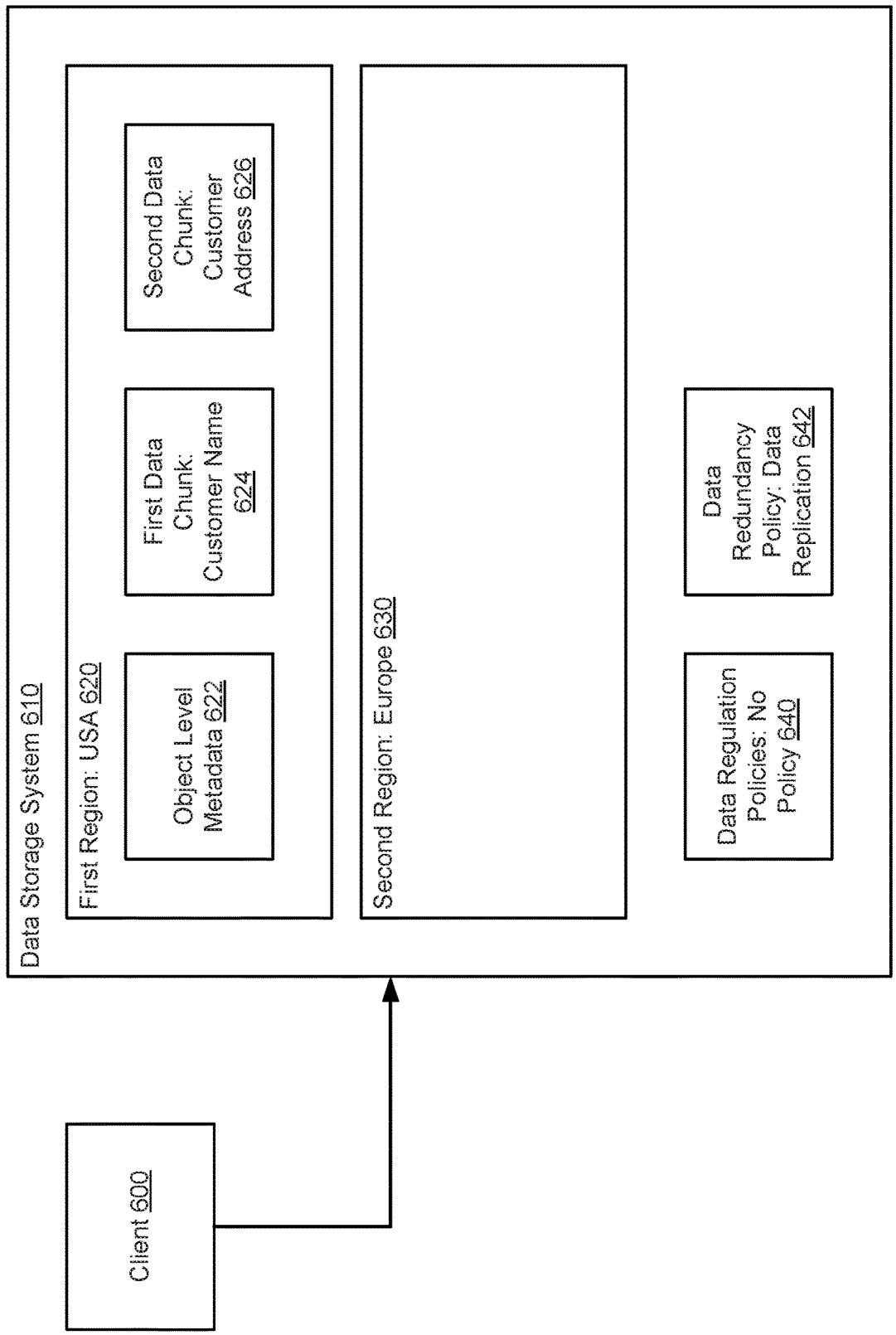
FIG. 6.2

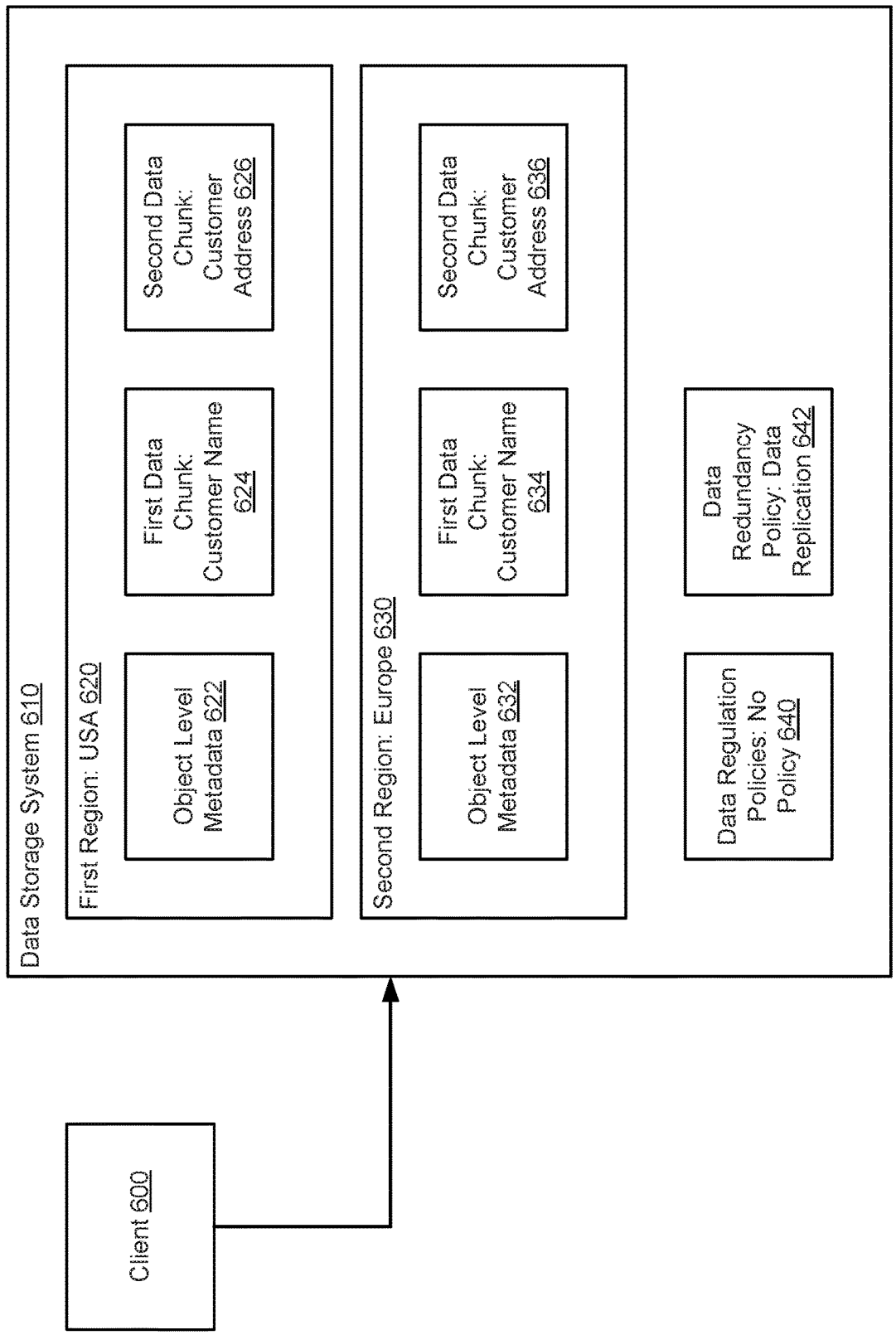
FIG. 6.3

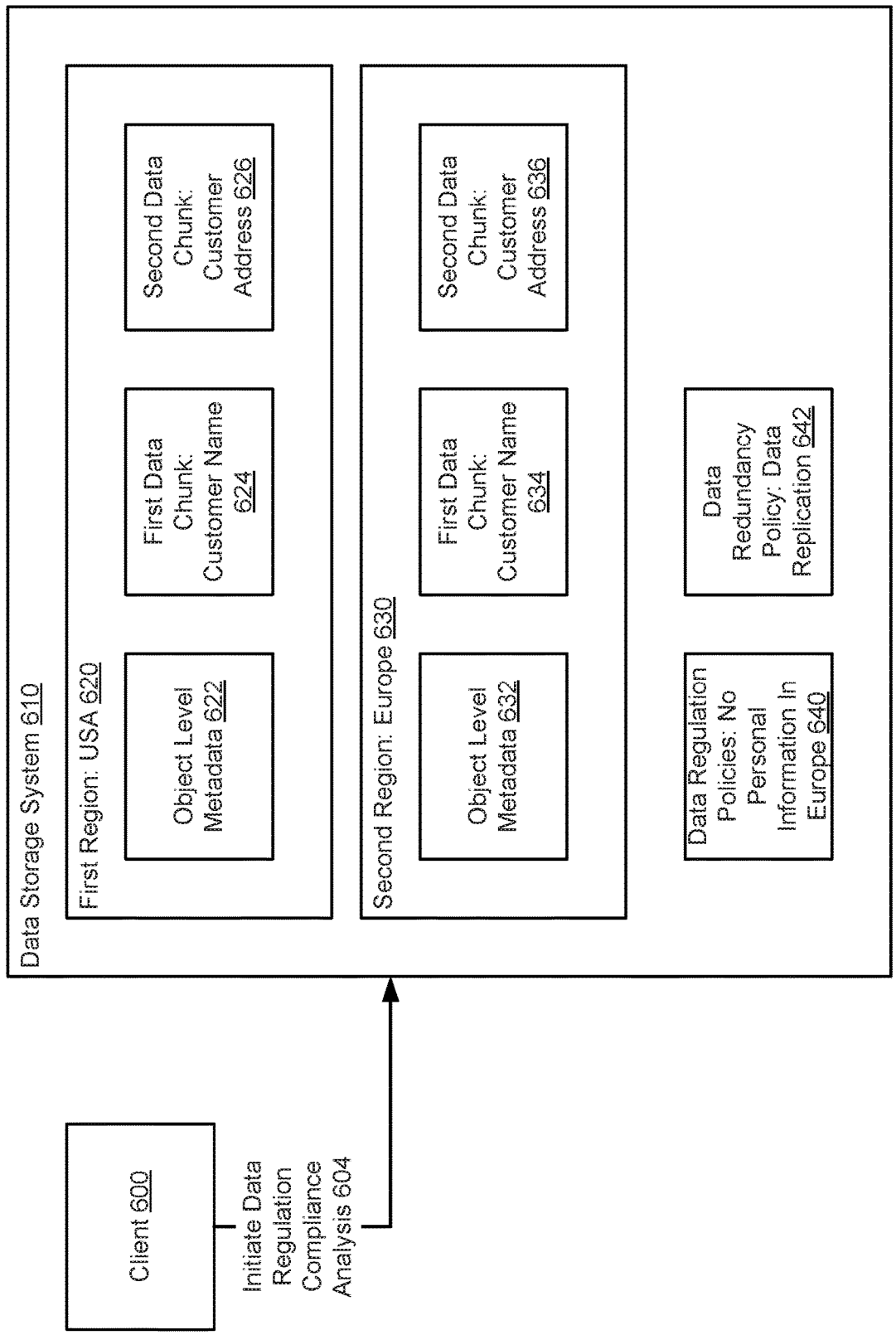
FIG. 6.4

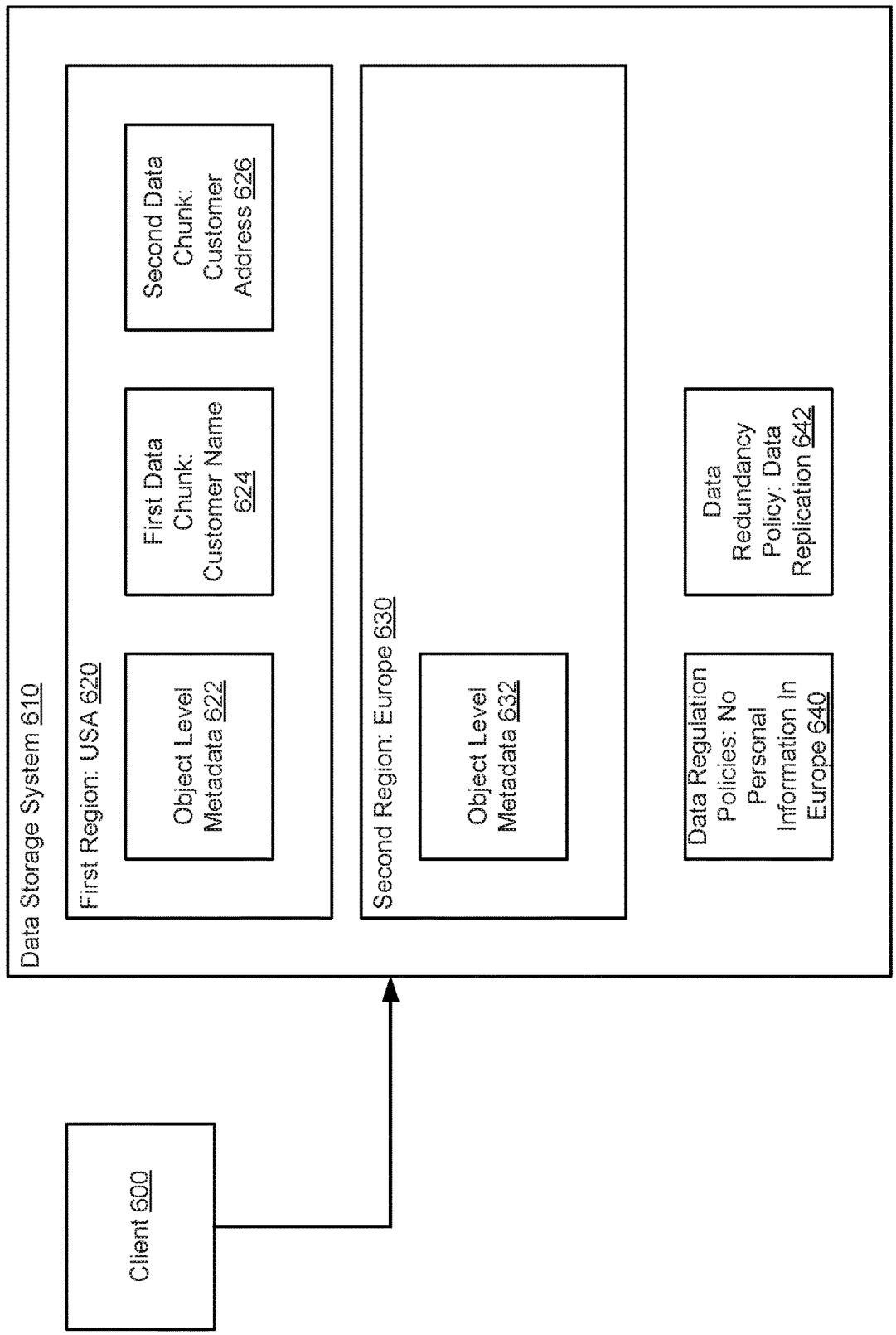
FIG. 6.5

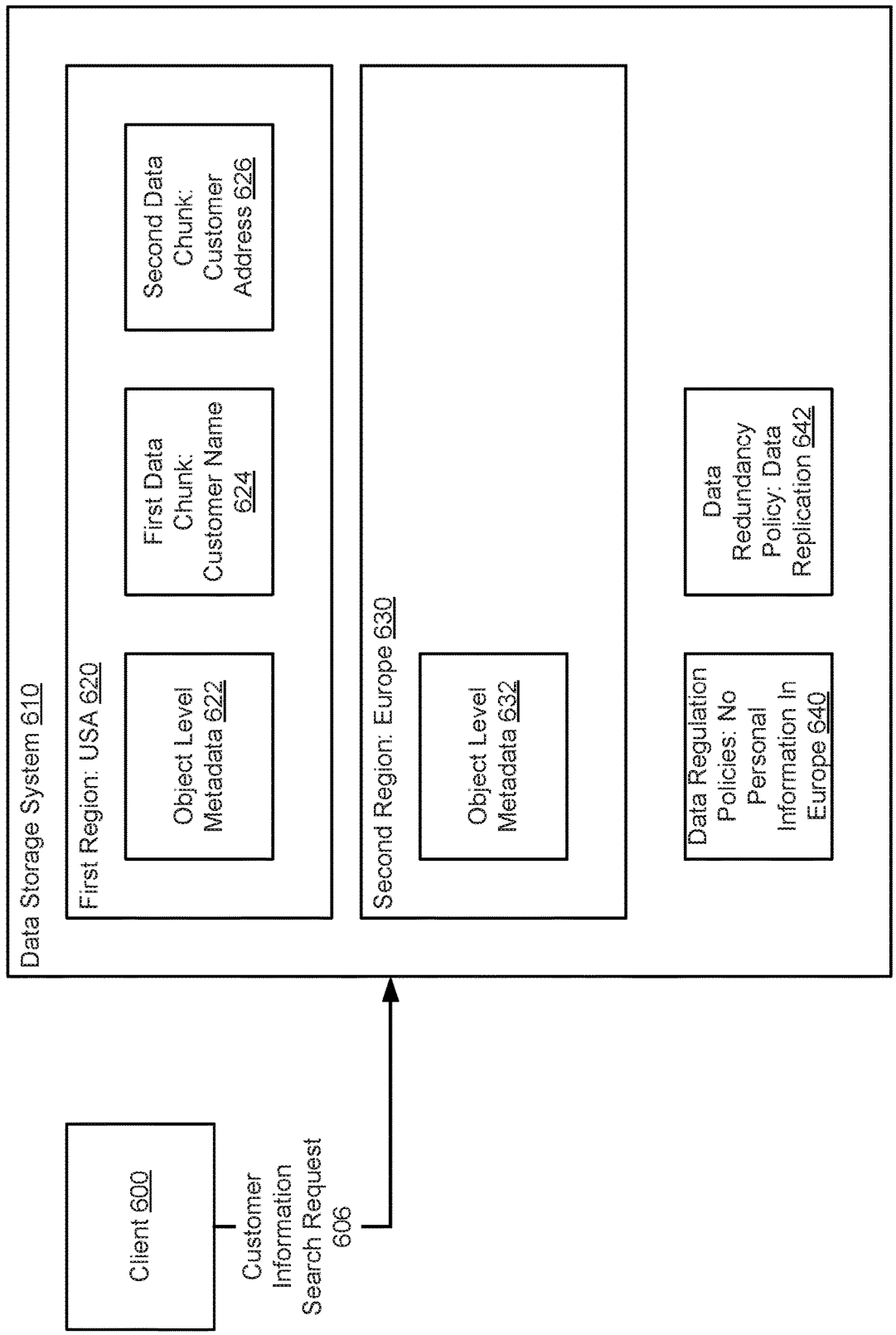
FIG. 6.6

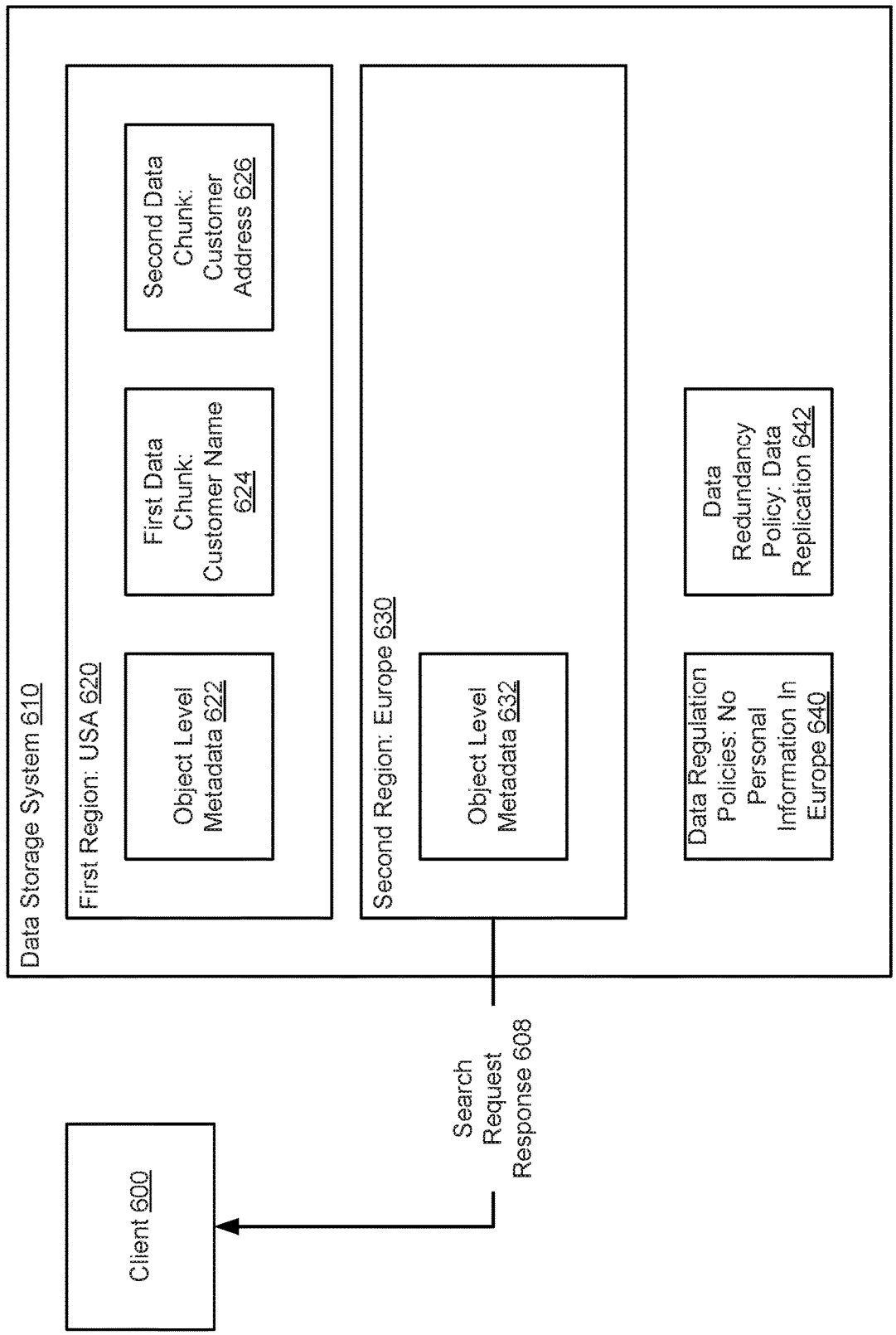
FIG. 6.7

SYSTEM AND METHOD FOR REMOVAL OF DATA AND METADATA USING AN ENUMERATOR

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost, it may be unrecoverable if no copies of the data were made and stored in locations other than the persistent storage. If copies of data are stored in other locations, the data may be separated from an application that utilizes the data. Due to the format of the data, it may be difficult to ascertain the contents of the data without utilizing the application that uses the data.

SUMMARY

In one aspect, a data storage system in accordance with one or more embodiments of the invention includes a first region for storing a first copy of data; a second region for storing a second copy of the data; and a global enumerator that performs a data control analysis of the data to identify that the first region is a high regulation region and the second region is a low regulation region; in response to making the identification: updating first metadata associated with the first copy of the data to regulate access to the first copy of the data; and updating second metadata associated with the second copy of the data to deregulate access to the second copy of the data.

In one aspect, a method for managing a data storage system in accordance with one or more embodiments of the invention includes performing a data control analysis of data to identify that a first region is a high regulation region and a second region is a low regulation region, the first region stores a first copy of the data and the second region stores a second copy of the data; in response to making the identification: updating first metadata associated with the first copy of the data to regulate access to the first copy of the data; and updating second metadata associated with the second copy of the data to deregulate access to the second copy of the data.

In one aspect, a non-transitory computer readable medium in accordance with one or more embodiments of the invention includes computer readable program code, which when executed by a computer processor enables the computer processor to perform a method for managing a data storage system, the method includes performing a data control analysis of data to identify that a first region is a high regulation region and a second region is a low regulation region, the first region stores a first copy of the data and the second region stores a second copy of the data; in response to making the identification: updating first metadata associated with the first copy of the data to regulate access to the first copy of the data; and updating second metadata associated with the second copy of the data to deregulate access to the second copy of the data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4.1 shows a diagram of an example storage in accordance with one or more embodiments of the invention.

FIG. 4.2 shows a diagram of data integrity coded chunks in accordance with one or more embodiments of the invention.

FIG. 4.3 shows a diagram of object level metadata in accordance with one or more embodiments of the invention.

FIG. 5.1 shows a flowchart of a method of servicing an update request in accordance with one or more embodiments of the invention.

FIG. 5.2 shows a flowchart of a method of matching metadata characteristics in accordance with one or more embodiments of the invention.

FIG. 5.3 shows a flowchart of a method of servicing a sub-request in accordance with one or more embodiments of the invention.

FIG. 5.4 shows a flowchart of a method of servicing a copy of a sub-request in accordance with one or more embodiments of the invention.

FIG. 5.5 shows a flowchart of a method of storing data in accordance with one or more embodiments of the invention.

FIG. 5.6 shows a flowchart of a method of enforcing data compliance in accordance with one or more embodiments of the invention.

FIG. 5.7 shows a flowchart of a method of managing data replicated across multiple regions in accordance with one or more embodiments of the invention.

FIGS. 6.1-6.7 show diagrams of an example system at different point in time.

DETAILED DESCRIPTION

Figure 1:
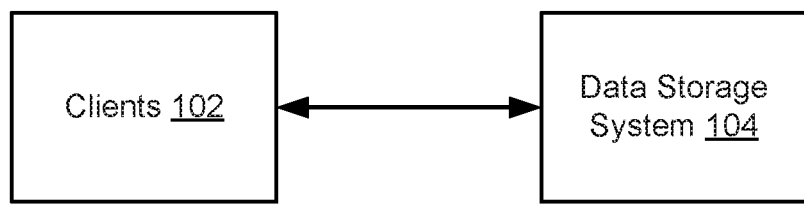
FIG. 1 shows a diagram of a system in time in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems devices and methods for managing data. Specifically, the system may provide methods of updating data and metadata to meet goals of an organization. Updating data and metadata may include, for example, deleting a replica of data, deleting metadata associated with a replica of data, and/or deleting both the replica of the data and the metadata associated with the replica of data.

By updating data and metadata, embodiments of the invention may provide a method for enforcing the goals of an organization. For example, the goals of an organization may be to meet governmental regulations on the storage and use of data. If data stored by the organization fails to meet the governmental regulations, embodiments of the invention may provide a method for computationally efficiently determining that the data fails to meet the governmental regulations and a method for removing the noncompliant data.

In another example, the goals of an organization may be to generate audit trails for its data in a computationally efficient manner. The audit trails may be used, for example, to comply with legal processes. To generate the audit trails in a computationally efficient matter, embodiments of the invention may provide a method for identifying duplicative copies of data and enforce generation of audit trails for only a single unique portion of duplicative copies of data. By doing so, embodiments of the invention may provide a method for ensuring that audit trails are generated without needlessly generating duplicative audit trails.

FIG. 1 shows a diagram of an example system in accordance with one or more embodiments of the invention. The system may facilitate the storage and modification of stored data and/or metadata that may impact the manner in which the stored data may be accessed and/or managed. The system may include clients (102) and a data storage system (104).

The clients (102) may utilize data management services provided by the data storage system (104). Utilizing the data management services may include storing data in the data storage system (104), obtaining data (or information regarding stored data) stored in the data storage system (104), and/or modifying the manner in which data may be accessed by modifying metadata associated with the data. By modifying the metadata associated with the data, access and management of the data in each region of the data storage system may be customized to meet regulatory and/or other type of requirements.

For example, the clients (102) may utilize the data storage system (104) to store data. Storing the data in the data storage system (104) may, for example, improve redundancy by storing a replica of data stored in the clients (102) in the data storage system (104), reduce the use of storage resources of the clients (102) by storing data in the data storage system (104) that would otherwise consume the clients' storage resources, or otherwise provide advantages to the clients (102).

Once stored in the data storage system (104), the data storage system (104) may manage the data by replicating the data, treating different replicas of the data differently to meet regulatory requirements, and/or treating different replicas of the data differently to meet other types of goals. To manage the data, the data storage system (104) may generate and store metadata that governs how the data is managed, enables computationally efficient searching of the data, and/or provides other types of features with respect to the stored data. By storing different types of metadata associated with different replicas of the data, the system may automatically manage the different replicas of the data different to meet system level goals.

The components of the system of FIG. 1 may be operably connected to each other (and/or other components) via any combination of wired and/or wireless networks. Each components of the system of FIG. 1 is discussed below.

The clients (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-5.4. The clients (102) may be implemented using other types of computing devices without departing from the invention. For additional details regarding computing devices, refer to FIG. 7.

The clients (102) may be implemented using logical devices without departing from the invention. For example, the clients (102) may be implemented using virtual machines that utilize computing resources of any number of physical computing devices (e.g., refer to FIG. 7) to provide their respective functionalities. The clients (102) may be implemented using other types of logical devices without departing from the invention.

In one or more embodiments of the invention, the clients (102) provide any number of computer implemented services. The computer implemented services may include, for example, file storage services, database services, electronic communication services, etc. The clients may provide other types of computer implemented services without departing from the invention. Each of the clients (102) may provide similar and/or different computer implemented services.

When providing computer implemented services, the clients (102) may utilize data management services provided by the data storage system (104). Utilizing the data storage services provided by the data storage system (104) may include (i) storing data in the data storage system, (ii) obtaining data stored in the data storage system, and/or (iii) modifying object level metadata and/or chunk level metadata to modify that manner in which data stored by the data storage system may be accessed or modified. Additionally, the clients (102) may invoke data analysis functionality of the data storage system to meet regulatory requirements, address potential data retention needs, and/or provide other types of functionality that may help the clients (102) meet their individual data management needs. As will be discussed in greater detail below, when modifying metadata to meet their individual data storage needs, the clients (102) may utilize an enumerator service provided by the data storage system (104).

To utilize the enumerator service, the clients (102) may send update requests to the data storage system (104). The update requests may include information that may be used by the data storage system (104) to discriminate a portion of the metadata and/or data that is of interest to the clients (102) from the other metadata and/or data stored in the data storage system (104).

In one or more embodiments of the invention, the information included in the update requests matches specific types of information used by the enumerator service provided by the data storage system (104) to discriminate metadata stored in the data storage system (104). By including the specific types of information used by the enumerator service, the metadata stored in the data storage system (104) may be discriminated without needing to (i) crawl the data and/or (ii) use system metadata that was used by a file system (or other organizational structure) of another computing device that provided the data to the data storage system (104) for storage purposes to discriminate the portion of the metadata that is relevant to an update request from all of the metadata stored in the data storage system (104). The update request may also specify one more modifications to be made to the metadata and/or data associated with the metadata. For example, the modification may be to delete all, or a portion, of the metadata and/or the data.

The system of FIG. 1 may include any number of clients (102) without departing from the invention.

The data storage system (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-5.7. The data storage system (104) may be implemented using other types of computing devices without departing from the invention. For additional details regarding computing devices, refer to FIG. 7.

The data storage system (104) may be implemented using logical devices without departing from the invention. For example, the data storage system (104) may be implemented using virtual machines that utilize computing resources of any number of physical computing devices (e.g., refer to FIG. 7) to provide their respective functionalities. The data storage system (104) may be implemented using other types of logical devices without departing from the invention.

In one or more embodiments of the invention, the data storage system (104) provides data management services. Providing data management services may include (i) storing data, (ii) providing stored data, and/or (iii) enabling metadata (e.g., object level metadata and/or chunk level metadata) and/or data stored in the data storage system (104) to be searched and/or modified. Additionally, the data management services may include enforcement of data regulation policies on stored data and/or metadata. The data regulation policies may specify rules for managing data stored in the data storage system (104).

To store data, the data storage system (104) may obtain data, modify the data to improve the likelihood that the data will be accessible in the future, add object level and/or chunk level metadata to the data, and store the modified data, the object level data, and chunk level metadata in storage of the data storage system (104) (and/or in other locations). For example, when the data storage system (104) obtains data for storage, the data storage system (104) may erasure code the data for data integrity purposes and thereby obtain data chunks.

The data storage system (104) may also generate object level metadata that is associated with a portion of the data that includes data of a respective object (e.g., a file used by an organizational system to organize data). The data storage system (104) may further generate chunk level metadata associated with each of the respective chunks. The object level metadata and/or the chunk level the data may include information that enables, for example, the data chunks associated with an object to be retrieved from storage, different portions of the chunks to be discriminated from one another (e.g., enable a level of search functionality), and/or enable different data chunks to otherwise be treated differently for any number of purposes.

For example, the object level metadata and/or the chunk level metadata may include (i) an object identifier that identifies an object associated with one or more data chunks, (ii) a identifier of a storage location of a data chunk, (iii) an identifier of a geographic region in which a data chunk is stored, (iv) an identifier of a data integrity scheme (e.g., erasure coding) used to generate the data chunk or how to use the data chunk based on an applied data integrity scheme, (v) an indicator of whether the data chunk has been deduplicated and/or the number of copies of data that the data chunk represents for deduplication purposes, (vi) an identifier of a region in which the data chunk is stored, (vii) an identifier of a computing resource aggregation in which the data chunk is stored, (viii) an identifier of a data chunk that may be used to retrieve the data chunk, (ix) a classification identifier that specifies a type of data included in a data chunk, and/or (x) an identifier of an organization that has rights (e.g., an owner) in a data chunk. The object level metadata and/or the chunk level metadata may include additional, different, and/or less information without departing from the invention.

To provide the stored data, the data storage system (104) may obtain any number of data chunks corresponding to desired data, reconstitute the desired data using the data chunks, and provide the desired data. For example, data having a particular characteristic may be desirable to an entity. To provide the data, the data storage system (104) may search the object level metadata and/or the chunk level metadata to determine whether the corresponding data chunks have characteristics matching the particular characteristics desired by the entity. Any data chunks matching the aforementioned characteristics may be obtained and used to provide the desired data.

To enable metadata and/or data stored in the data storage system (104) to be searched and/or modified, the data storage system (104) may generate object level metadata and/or chunk level metadata in a predetermined manner (e.g., having a predetermined format that includes predetermined types of information). Any number of copies of the metadata may be stored in any number of locations to facilitate searching of the aggregate and/or discrete portions of the metadata. Consequently, object level metadata and/or chunk level metadata may be searched in a computationally and/or time efficient.

To enforce data regulation policies, the data storage system (104) may utilize object level metadata and/or chunk level metadata to identify any data and/or metadata that may be associated with any of the data regulation policies, compare the data regulation policies to the associated data and/or metadata, and modify the metadata and/or data to meet the requirements of the data regulation policies. For example, the data storage system (104) may delete data while retaining associated metadata if a data regulation policy indicates that the data may not be stored in a location in which the data is stored. The data regulation policies may be enforced via other methods without departing from the invention.

Figure 2:
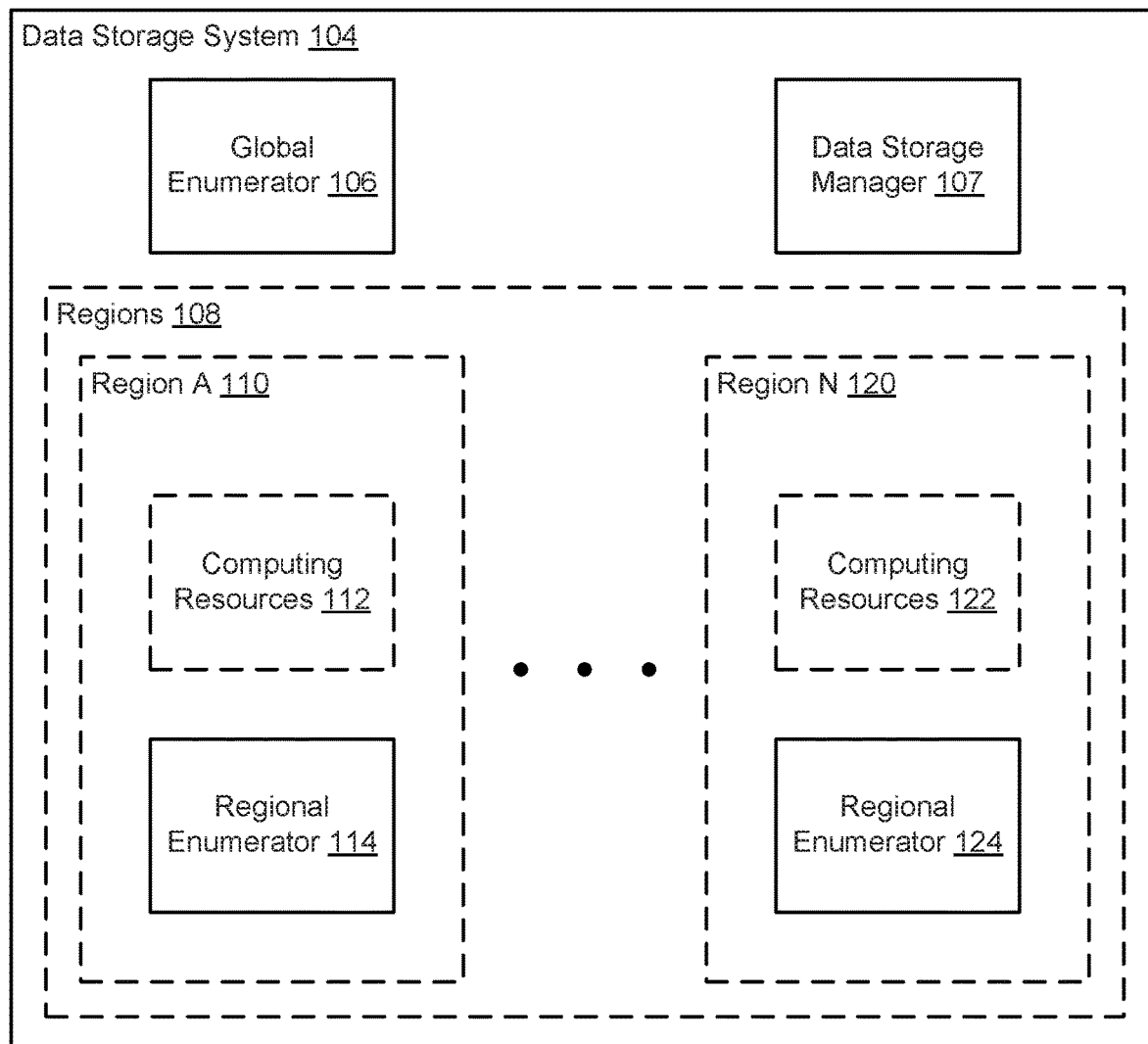
FIG. 2 shows a diagram of a data storage system in accordance with one or more embodiments of the invention.
Figure 3:
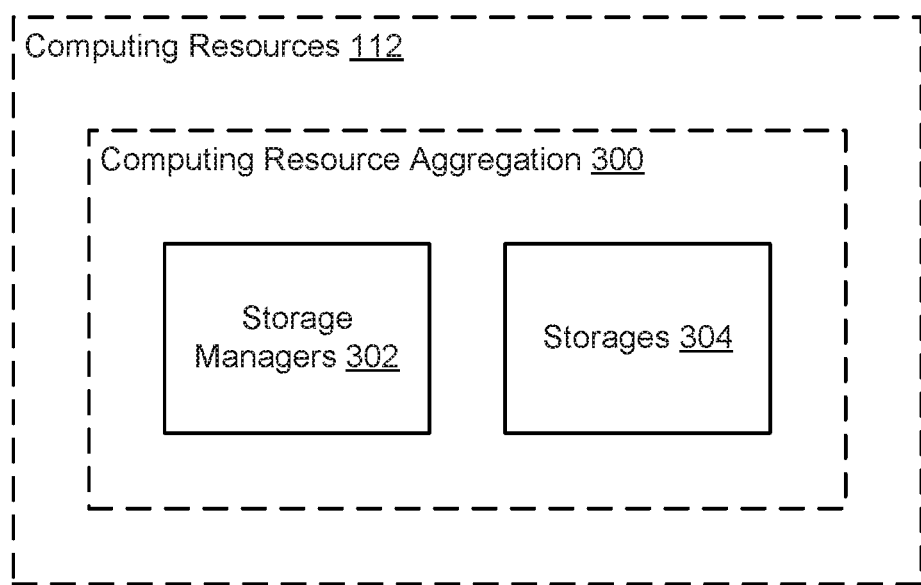
FIG. 3 shows a diagram of computing resources in accordance with one or more embodiments of the invention.

For additional details regarding the data storage system (104), refer to FIGS. 2-4.3.

While the system of FIG. 1 has been illustrated and described as including a limited number of specific components, a system in accordance with one or more embodiments of the invention may include additional, fewer, and/or different components without departing from the invention.

As discussed above, a data storage system in accordance with one or more embodiments of the invention may provide data management services to any number of clients and/or other entities. FIG. 2 shows a diagram of a data storage system (104) in accordance with one or more embodiments of the invention. As discussed above, the data storage system (104) may provide data management services to clients.

To provide data management services to the clients, the data storage system (104) may include a global enumerator (106), a data storage manager (107), and any number of regions (108). Each of these components of the data storage system (104) is discussed below.

The global enumerator (106) may provide search functionality, data retrieval functionality, and/or metadata (e.g., object level metadata and/or chunk level metadata) and/or data modification functionality for data and/or metadata stored in the data storage system (104). For example, the global enumerator (106) may receive update requests for modifications of metadata and/or data and service the aforementioned request. The update request may be, for example, a request to modify metadata data having a particular characteristic(s) to have additional and/or different characteristics (e.g., deletion of a portion of the metadata). By modifying the metadata, the manner in which the data stored in the data storage system may be searched, modified, accessed, etc.

To service the update requests, the global enumerator (106) may include functionality to search object level metadata and/or chunk level metadata associated with data stored in the data storage system (104). To search the aforementioned metadata, the global enumerator (106) may include functionality to generate sub-requests based on an update request. The sub-request may be a request that has been customized for a particular region of the regions (108). The global enumerator (106) may generate any number of such sub-requests when servicing an update request.

For example, an update request obtained by the global enumerator (106) may only implicate metadata stored in a subset of the regions (108). To service the aforementioned update request, the global enumerator (106) may only generate sub-requests for each of the implicated regions. Once generated, the global enumerator (106) may send the aforementioned sub-requests to the corresponding regions. By doing so, only regions implicated by update requests may receive sub-requests. Consequently, the total computing resources consumed for servicing an update request may be reduced when compared to servicing an update request by generating and sending sub-requests to all of the regions, even those that are unlikely to include metadata responsive to the update request.

To generate such sub-requests, the global enumerator (106) may maintain a cache (not shown) or other type of data structure that includes a portion of the object level metadata and/or chunk level metadata maintained by the regions (108). For example, the global enumerator (106) may maintain a cache of the object level metadata included in each of the regions (108). By doing so, the global enumerator (106) may utilize the data included in the cache to determine which of the regions is likely to include metadata that is responsive to an update request. By doing so, the global enumerator (106) may generate a customized set of sub-requests for each update request (e.g., by identifying a subset of the regions based on copies of metadata included in the cache).

Once the sub-requests are generated, the global enumerator (106) may send the sub-requests to corresponding regions. More specifically, the sub-requests may be sent to regional enumerators in each of the regions. In turn, the regional enumerators may process the obtained sub-requests to modifying corresponding metadata in the region.

The global enumerator (106) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the global enumerator (106) described in this application and/or all, or a portion, of the methods illustrated in FIGS. 5.1-5.7. The global enumerator (106) may be implemented using other types of computing devices without departing from the invention. For additional details regarding computing devices, refer to FIG. 7.

The global enumerator (106) may be implemented using logical devices without departing from the invention. For example, the global enumerator (106) may be implemented using virtual machines that utilize computing resources of any number of physical computing devices (e.g., refer to FIG. 7) to provide their respective functionalities. The global enumerator (106) may be implemented using other types of logical devices without departing from the invention.

The data storage manager (107) may provide data storage functionality. For example, the data storage manager (107) may obtain data for storage, encode the data for data reliability purposes (e.g., erasure code), generate object level and/or chunk level metadata, deduplicate the data, and store the data and/or the aforementioned metadata. When storing coded data, the data storage manager (107) may store the data across multiple fault domains in accordance with a data integrity scheme (e.g., erasure coding). The data storage manager (107) may also store the object level metadata and/or chunk level metadata in a searchable repository. By doing so, the regional enumerators (e.g., 114, 124) may service sub-requests by searching the aforementioned metadata rather than the data chunks.

The data storage manager (107) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the data storage manager (107) described in this application and/or all, or a portion, of the methods illustrated in FIGS. 5.1-5.7. The data storage manager (107) may be implemented using other types of computing devices without departing from the invention. For additional details regarding computing devices, refer to FIG. 7.

The data storage manager (107) may be implemented using logical devices without departing from the invention. For example, the data storage manager (107) may be implemented using virtual machines that utilize computing resources of any number of physical computing devices (e.g., refer to FIG. 7) to provide their respective functionalities. The data storage manager (107) may be implemented using other types of logical devices without departing from the invention.

While the global enumerator (106) and the data storage manager (107) are illustrated as entities separate from the regions (108), the regions (108) may provide the functionality of the global enumerator (106) and the data storage manager (107) without departing from the invention. For example, the regional enumerator in each of the regions may provide the functionality of the global enumerator (106) when a particular region (e.g., 110, 120) obtains an update request (or other type of request that implicates distributed action by the data storage system (104)). The aforementioned regional enumerator may provide the functionality of the global enumerator (106) in addition to its own functionality of the regional enumerator, which will be discussed in greater detail below. Similarly, each of the regions (108) may separately host respective instances of the data storage manager (107) and/or the global enumerator (106).

The regions (108) may be logical groupings of computing resources. The data storage system (104) may include any number of regions. The computing resources of each region may include any number of physical and/or logical computing devices. For details regarding a physical computing device, refer to FIG. 7. The computing resources (e.g., 112, 122) of each of the regions (e.g., 110, 120) may host a regional enumerator (e.g., 114, 124) and may provide data management services. The data management services provided by the computing resources (e.g., 112, 122) of each region may include storing of data, storing of metadata, and modification of stored data and/or metadata. For additional details regarding computing resources, refer to FIG. 3.

As discussed above, the regional enumerators may service sub-requests obtained from the global enumerator (106). To service sub-requests, the regional enumerators (e.g., 114, 124) may obtain the requests, use object level metadata and/or chunk level metadata to identify any number (e.g., none, one, many) of portions of the metadata that are responsive to the requests, and take action to complete the requests. For example, the actions may include modifying all, or a portion, of the object level metadata and/or chunk level metadata that is responsive to the requests. In another example, the actions may include modifying all, or a portion, of stored data that is associated with the object level metadata and/or chunk level metadata that is responsive to the requests. The modifications of the data and metadata may be, for example, to remove all, or a portion, of the data and/or the metadata.

By modifying the data and/or metadata, the regional enumerators may enable the data storage system to comply with, for example, regulations regarding storage of data and/or meet other types of goals with respect to data retention. Modifying the data and/or the metadata may provide other features without departing from the invention.

The regional enumerators may be implemented using physical and/or logical devices. For example, the regional enumerators may be implemented using computer readable instructions (e.g., program code) that when executed by the computing resources of a region give rise to the functionality of the regional enumerator. In another example, the regional enumerators may be implemented using special purpose hardware devices such as, for example, programmable gate arrays, application specific integrated circuit, or other type of hardware device that provides the functionality of the regional enumerators by including circuitry adapted to provide the aforementioned functionality. In a still further example, the regional enumerators may be implemented using a combination of computer readable instructions (e.g., program code) and special purpose hardware devices that cooperatively provide the functionality of the regional enumerators.

In some embodiments of the invention, the different regions of the regions (108) may correspond to logical groupings of computing resources that are disposed in different geographic regions. The geographic regions may, for example, correspond to different countries that place different data control restrictions on the storage and/or transmission of different types of data. Consequently, the computing resources disposed in each of the different regions (e.g., 110, 120) may be subject to different data control restrictions. Data control restrictions may be, for example, limits on how data may be modified, transferred, or otherwise utilized. For example, personal information may be regulated in Europe under the general data protection regulation which provides for civil penalties regarding specific uses of personal information.

For example, consider a scenario in which the computing resources (112) of region A (110) may be disposed in the United States while the computing resources (122) of region N (120) may be disposed in Europe. Each of these geographic regions has different data control restrictions imposed by the local governments. Consequently, the governmental regulations that apply to data stored in the computing resources (112) of region A (110) may be different from those that apply to the data stored in the computing resources (122) of region N (120).

While the data storage system (104) has been described and illustrated as including a limited number of specific components, a data storage system (104) in accordance with embodiments of the invention may include additional, fewer, and/or different components.

As discussed above, a region (e.g., 110, 120) may be a logical grouping of computing resources. The grouping may correspond to a geographic and/or regulatory boundary (e.g., all of the computing resources of a region may be subject to the same data control restrictions). FIG. 3 shows a diagram of computing resources (112) in accordance with one or more embodiments of the invention.

The computing resources (112) of a region may include any number of computing resource aggregations (e.g., 300) as illustrated in FIG. 3. A computing resource aggregation (300) in accordance with one or more embodiments of the invention may include any quantity of physical and/or logical computing resources.

For example, a computing resource aggregation (300) may be implemented as a computing cluster, a cloud resource (e.g., a logical entity that utilizes any quantity of computing resources of any number of physical computing devices), a hyperconverged architecture, a server farm, or any other type of grouping of computing resources. The physical and/or logical computing resources of the computing resource aggregation (300) may be adapted to provide the functionality of the computing resource aggregation (300). To be adapted to provide the functionality of the computing resource aggregation (300), the physical computing resources of the computing resource aggregation (300) may execute computer instructions (e.g., computer code) that cause processing devices of the computing resource aggregation (300) to provide all, or a portion, of the functionality of the computing resource aggregation (300), the physical computing resources may include dedicated circuitry that provides all, or a portion, of the functionality of the computing resource aggregation (300), and/or include/host other types of physical and/or logical entities that provide the functionality of the computing resource aggregation (300).

The computing resource aggregation (300) may provide data storage services. The data storage may include storing data, metadata, and providing copies of stored data and metadata. To provide the functionality of the computing resource aggregation (300), the computing resource aggregation (300) may include one or more storage manager (302) and one or more storages (304). Each of the aforementioned components of the computing resources aggregation (300) is discussed below.

The storage managers (302) may manage storing of data in storage resources of the computing resource aggregation (300) and providing copies of data stored in the storage resources. For example, the storage managers (302) may store data in the storages (304) and provide data stored in the storages (304) in response to requests from regional enumerators and/or other entities.

To do so, the storage managers (302) may include functionality to generate data chunks, object level metadata, and/or chunk level metadata, as discussed above. To generate the data chunks, the storage managers (302) include functionality to encode data for data integrity purposes. For example, the storage managers (302) may include functionality to generate erasure coded data that includes any number of data and parity chunks.

The storage managers (302) may include functionality to implement any number of erasure coding algorithms. The erasure coding algorithms implemented by the storage managers (302) may generate erasure coded data (e.g., data integrity coded chunks) corresponding to any erasure coding scheme (e.g., 3:1, 4:2, etc.). The storage managers (302) may include functionality to store the aforementioned data chunks across any number of fault domains for data integrity purposes.

Additionally, the storage managers (302) may include functionality to regenerate data in accordance with any number of erasure coding schemes (or other type of data integrity schemes). For example, the storage managers (302) may be capable of responding to failures of one or more of the storages (304) by regenerating any portion of the data stored in the failed one or more of the storages (304) in accordance with data integrity schemes employed by the storage managers (302).

For example, consider a scenario in which data chunks are erasure coded in a 3:1 manner and stored across four of the storages (304). In response to a failure of one of the four storages, the storage managers (302) may regenerate the data using the remaining data. Once regenerated, the regenerated data may be stored in another one of the storages (304) (and/or in another computing resource aggregation).

In addition to erasure coding data for data integrity purposes, the storage managers (302) may implement any number of other data integrity algorithms and/or data storage efficiency algorithms such as, for example, mirroring and deduplication.

The storage managers (302) may also store any number of copies of object level metadata and/or chunk level metadata. For example, the storage managers (302) may store copies of the aforementioned metadata data in persistent storage (e.g., the storages (304)) and/or memory (i.e., an in-memory data structure).

The storage managers (302) may be implemented using any combination of physical and/or logical devices. For example, the storage managers (302) may be implemented using computer readable instructions (e.g., program code) that when executed by the computing resources of the computing resource aggregation (300) give rise to the functionality of the storage managers (302). In another example, the storage managers (302) may be implemented using special purpose hardware devices such as, for example, programmable gate arrays, application specific integrated circuit, or other type of hardware device that provides the functionality of the storage managers (302) by including circuitry adapted to provide the aforementioned functionality. In a still further example, the storage managers (302) may be implemented using a combination of computer readable instructions (e.g., program code) and special purpose hardware devices.

While the storage managers (302) are illustrated in FIG. 3 as being separate devices from that of the storages (304), the functionality of the storage managers (302) may be performed by the storages (304) without departing from the invention.

The computing resource aggregation (300) may include any number of storage managers (302). For example, the computing resource aggregation (300) may include more storages (304) than storage managers (302) (e.g., a storage manager utilizes the storage resources of multiple storages) or the same number of storage managers (302) as storages (304) (e.g., each storage manager utilizes only the storage resources of a corresponding storage). In some embodiments of the invention, two storages may utilize the storage resources of a single storage (e.g., different portions of the storage resources of the storage are utilized by different storage managers). In some embodiments of the invention, two storages may share a portion of the storage resources of a single storage (e.g., a shared storage resource).

The storages (304) may be implemented using physical and/or logical devices that provide storage resources that may be utilized by the storage managers (302) and/or other entities. For example, the storages (304) may be implemented using physical (e.g., hard disk drives, solid state drives, etc.) and/or logical storages (e.g., virtual disks). By proving storage resources to the storage managers (302), the storage managers (302) may be able to store data using the storage resources and provide copies of stored data using the storage resources.

In one or more embodiments of the invention, all, or a portion, of the storage (304) are implemented as computing accelerated storage devices. A computing accelerated storage device may be a storage device that includes the ability to execute algorithms (e.g., includes processing/memory resources to execute computer instructions and/or includes a hardware device that includes dedicated circuitry that provides the functionality of the algorithms) to facilitate storing of data in persistent storage of the computing accelerated storage device. For example, a computing accelerated storage device may include processing resources, memory resources, and may store computer instructions that when executing using the processing resources and/or memory resources causes the computing accelerated storage device to perform one or more algorithms. The one or more algorithms may correspond to all, or a portion, of the functionality of the storage managers (302).

Implementing the storages (304) using computing accelerated storage devices may enable the computing resource aggregation (300) to perform distributed algorithms, at the storage level, in a coordinated manner to provide its functionality. Doing so may free the computing resources of devices hosting the storages (304) to perform other types of functionality of the computing resource aggregation (300). For example, a computing device of the computing resource aggregation (300) may include both a processor and a computing accelerated storage. The computing accelerated storage may provide a portion of the functionality of the computing device (i.e., implementing storage algorithms) without utilizing processing resources of the processor or other types of hardware devices of the computing device.

While the computing resources (112) have been described as including a limited number of specific components, the computing resources (112) may include additional, different, and/or fewer components without departing from the invention.

As discussed above, a data storage system in accordance with embodiments of the invention may store data in a format (i.e., a data structure) that enables stored data and metadata to be searched for particular characteristics without resorting to crawling the stored data, which may be computationally expensive. To further clarify aspects of the format of stored data and metadata in accordance with embodiments of the invention, FIGS. 4.1-4.3 show a diagram of an example storage (400) that stores data in a particular format and diagrams of data structures that may be used by the example storage (400), respectively. All or a portion of the storages of a computing resource aggregation in accordance with embodiments of the invention may be similar to the example storage (400) shown in FIG. 4.1.

FIG. 4.1 shows a diagram of an example storage (400) in accordance with embodiments of the invention. The example storage (400) may be similar to the storages (304) illustrated in FIG. 3. As discussed with respect to the storages (304) of FIG. 3, the example storage (400) may provide all, or a portion, of the functionality of a storage manager (402) corresponding to one of the storage managers illustrated in FIG. 3.

The storage manager (402) (illustrated with a dashed outline to indicate that the example storage (400) may not include a storage manager) may include functionality to perform any number of algorithms related to storing data and metadata in persistent storage (410) of the example storage (400) and providing data and metadata stored in the persistent storage (410). For example, the storage manager (402) may include functionality to store data in an erasure coded format (or other type of data integrity storage format), deduplicate data before storing it, search/generate object level metadata and/or chunk level metadata, modify an erasure coding format of stored data, store data in other storages (e.g., to meet fault domain or other restrictions related to data integrity schemes employed for data storage purposes), and/or other functionalities.

In one or more embodiments of the invention, the storage manager (402) may store data in an auditable format. For example, when object level metadata associated with any number of data chunks indicates that an audit trail is to be generated, the storage manager (402) may store changes to data rather than modifying data when modifications to the data chunks are made. For example, the storage manager (402) may generate a new data chunk when a modification to a data chunk is made. The new data chunk may reflect the changes to the data chunk upon which the new data chunk is based. A time stamp (e.g., 418) for the new data chunk may also be stored to enable a trail of changes to data chunks over time to be recorded. Consequently, any number of data chunks associated with different points in time by corresponding time stamps (418) may be stored when modifications to a particular data chunk is made.

The storage manager (402) may determine when to store data (and/or modify data stored date) in a manner to generate an audit trail when object level metadata and/or chunk level metadata indicates that an audit trail should be generated. For example, the aforementioned data may include a flag, or another type of indicator, that is used by the storage manager (402) to determine whether to store/modify data in an auditable format or whether not to store/modify data in an auditable format.

The storage manager (402) may also enforce data regulation policies (419). The data regulation policies (419) may specify how data may be managed by the example storage (400). To enforce the data regulation policies (419), the storage manager (402) may modify (e.g., change the contents of, delete, etc.) all, or a portion, of the data integrity coded chunks (412), the object level metadata (414), the chunk level metadata (416), and/or the time stamps (418).

When providing its functionality, the storage manager (402) may generate, store, and/or utilize previously stored data integrity coded chunks (412), object level metadata (414), and/or chunk level metadata (416) in persistent storage (e.g., 410).

To store data, the example storage (400) may include persistent storage (410). The persistent storage (410) may provide storage resources. To provide storage resources, the persistent storage (410) may include any number of physical devices for storing data. For example, the persistent storage (410) may include hard disk drives, solid state drives, tape drives, or any other type of physical storage devices that provides non-transitory storage resources. The persistent storage (410) may also include transitory storage resources such as, for example, memory for temporarily storing data until the data is able to be stored in non-transitory storage resources.

The persistent storage (410) may store data integrity coded chunks (412), object level metadata (414), chunk level metadata (416), time stamps (418), and/or data regulation policies (419). Each of these data structures is discussed below.

The data integrity coded chunks (412) may be data structures that include information reflecting data (420), system metadata (422), and/or data integrity information (424), as illustrated in FIG. 4.2. The data integrity coded chunks (412) may include any number of data chunks. Each data chunk may correspond to a portion of data generated by a data integrity scheme such as, for example, erasure coding or other type of scheme. For example, any number of data chunks may be generated when an erasure coding algorithm is performed on any quantity of data. The quantity of data may include data (420) from a system (e.g., file system or other type of data organization scheme) and/or metadata (422). When performing the algorithm, data integrity information (424) may be generated. The data integrity information (424) may be, for example, parity chunks that enable a portion of the chunks to be regenerated when the chunks are lost due to, for example, failure of a persistent storage.

In one or more embodiments of the invention, multiple versions of a particular data chunk are included in the data integrity coded chunks (412). As noted above, embodiments of the invention may provide a method for generating an audit trail. An audit trail may be a collection of copies of a particular data chunk over time. In other words, the audit trail may include any number of copies of the data chunk that are associated with different portions in time (e.g., after changes to the particular data chunk have been made). Each of the copies of the data chunk may include different information (and/or duplicative information included in other data chunks of the audit trail).

Returning to FIG. 4.1, the object level metadata (414) may be a data structure that includes metadata associated with any number of the data chunks of the data integrity coded chunks (412). For example, a portion of the object level metadata (414) may correspond to a number of the data chunks that include information regarding a particular object (e.g., a file). The portion of the object level metadata (414) may include, for example, an identifier of an object (e.g., a file name), characteristics of the object, identifiers of data chunks of the data integrity coded chunks (412) corresponding to the object, and other types of information associated with the object. The object level metadata (414) may include any number of portions that correspond to any number of objects associated with respective portions of the chunks of the data integrity coded chunks (412). For additional information regarding object level metadata (414), refer to FIG. 4.3.

The chunk level metadata (416) may be a data structure that includes metadata associated with corresponding chunks of the data integrity coded chunks (412). For example, a portion of the chunk level metadata (416) may correspond to a single data chunk of the data chunks of the data integrity coded chunks (412). The portion of the chunk level metadata (416) may include, for example, an identifier of the single data chunk, access information for the single data chunk (e.g., an identifier of a storage that stores the single chunk, an identifier of a computing resource aggregation that includes the storage, an identifier of a region that includes the computing resource aggregation, etc.), and/or classification information regarding the single data chunk. The classification information may include, for example, information regarding the single data chunk such as, for example, whether the single chunk includes information that may be restricted due to jurisdictional regulations (e.g., personal information), access restrictions with respect to the single data chunk, and/or other types of information regarding the single data chunk. The chunk level metadata (416) may include any number of portions that correspond to any number of data chunks. Each of the corresponding data chunks may be stored in the example storage (400) and/or in other storages.

The time stamps (418) may be data structures that specify different points in time that are associated with corresponding data integrity coded chunks (412). The time stamps (418) may specify points in time at which a particular data chunk was modified. The data integrity coded chunk corresponding to a time stamp may represent the state of the particular data chunk. Thus, the time stamps (418) and a portion of the data integrity coded chunks (412) may be used to track changes to a data chunk over time. In this manner, prior versions of data chunks may be accessed.

The data regulation policies (419) may be a data structure that includes information regarding how data stored by the example storage (400) should be managed (e.g., whether the data may be stored). The data regulation policies (419) may include such information for any amount of data stored in the example storage (400). The data regulation policies (419) may include any quantity and type of information that indicates how the date stored in the example storage (400) and/or in other locations is to be managed. The information may, for example, specify acceptable storage locations for data, a duration that data may be stored, types of data that cannot be stored, etc. The data regulation policies (419) may be obtained from, for example, clients. The data regulation policies may be obtained from other sources without departing from the invention.

While the example storage (400) has been described as including a limited number of specific components, an example storage (400) in accordance with embodiments of the invention may include additional, fewer, and/or different components without departing from the invention. Further, while the data structures illustrated in FIGS. 4.1-4.2 have been described as being separate and including a limited amount of specific information, the aforementioned data structure may include additional, different, and/or less information, may be stored in other locations, may be distributed across any number of devices, and may be subdivided into any number of data structures stored in any number of locations without departing from the invention.

As discussed above, object level metadata may include information regarding an object, information used to manage the data chunks corresponding to the object, and/or other types of information. FIG. 4.3 shows a diagram of object level metadata (414) in accordance with one or more embodiments of the invention. The object level metadata (414) may include geolocation information (430), policy information (432), organization information (434), industry information (436), retention information (438), and/or data control restrictions (440). Each of these components of the object level metadata (414) is discussed below.

The geolocation information (430) may specify geographic information associated with one or more objects. For example, the geolocation information (430) may specify a geographic region in which an object resides (i.e., where the storages are located that store the data chunks associated with an object), governmental regulations on the object (e.g., if the object is subject to regulations such as the general data protection regulation), and/or other types of geographic information associated with the object.

The policy information (432) may specify information regarding data management policies associated with one or more objects. For example, the policy information (432) may specify where the object is to be stored (i.e., storages, regions, etc.) over time, a level of redundancy for storing of the object, and/or other types of information used to store the object.

The organization information (434) may specify information regarding an organization that has rights in one or more objects. For example, the organization information (434) may specify organizations that are the owners of one or more of the object, have access rights to one or more of the objects, or any other types of rights that organizations may have with respect to objects.

The industry information (436) may specify information regarding types of industries associated with owners of objects. For example, the industry information (436) may specify whether governmental regulations associated with different industries may restrict or otherwise require objects to be handled in a prescribed manner. For example, medical data may be subject to different types of compliance standards than customer sales records.

The retention information (438) may specify retention plans for one or more of the objects. The retention plans may specify when, how, and under what conditions the objects may be deleted. For example, a retention plan may specify that a particular object is to be retained in storage for one year and may be deleted after the one year period.

The data control restrictions (440) may specify how data chunks associated with respective objects are to be handled. For example, the data control restrictions (440) may specify whether data may be deleted, modified, or read. In another example, the data control restrictions (440) may specify whether an audit trail is to be maintained. In a still further example, the data control restrictions (440) may specify whether particular users are authorized to access, modify, and/or delete the data chunks associated with a respective object.

While the object level metadata (414) has been illustrated and described as including a limited amount of specific information, object level metadata (414) in accordance with embodiments of the invention may include additional, different, and/or less information without departing from the invention.

Returning to FIG. 1, the data storage system (104) may provide data management services for clients and/or other entities. FIGS. 5.1-5.7 illustrates methods that may be performed by the data storage system (104) of the system of FIG. 1 when providing data management services.

FIG. 5.1 shows a flowchart of a method in accordance with one or more embodiments of the invention. The method depicted in FIG. 5.1 may be used to service update requests in accordance with one or more embodiments of the invention. The method shown in FIG. 5.1 may be performed by, for example, a data storage system (e.g., 104, FIG. 1.1). Other components of the system illustrated in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, an update request is obtained. The update request may include a metadata characteristic and update data.

In one or more embodiments of the invention, the update request is obtained by a global enumerator. The update request may be obtained by receiving the request in a message from client or another type of entity. The update request may be obtained by a regional enumerator acting as a global enumerator without departing from the invention.

In one or more embodiments of the invention, the update request is a request for updating data and/or metadata stored by the data storage system. For example, the update request may be a request to modify all object level metadata in a region to indicate that an audit trail for data chunks associated with the object level metadata should be generated.

In one or more embodiments of the invention, the update request is a request to delete a portion of data stored by a data storage system. For example, the update may include update data that specifies that data chunks associated with an object in a first region are to be deleted while the metadata data associated with the object is to be retained and that data chunks associated with the object in a second region are to be retained.

In one or more embodiments of the invention, the update request is a request to delete a portion of object level metadata associated with an object. For example, the update data of the update request may indicate that an audit trail should be generated for a first copy of an object stored in a first region but that an audit trail for a second copy of the object stored in a second region should not be generated.

In one or more embodiments of the invention, the update request is a request to delete data chunks and all metadata associated with an object. For example, the update data of the update request may indicate that all data chunks and all metadata, regardless of storage location, are to be deleted.

In one or more embodiments of the invention, the metadata characteristic specifies a characteristic of object level and/or chunk level metadata. The characteristic of the metadata may match one or more portions of the object level metadata and/or the chunk level metadata.

For example, the metadata characteristic may specify a computing resource aggregation of a region. In other words, the update request may be a request for modifying all metadata (e.g., object/chunk level metadata) and/or data associated with an object that is stored in a particular computing resource aggregation.

In one or more embodiments of the invention, the metadata characteristic is multi-dimensional. In other words, the metadata characteristic specifies multiple characteristics. For example, the metadata characteristic may be for (i) all metadata stored in a particular computing resource aggregation and (ii) that is of a particular classification (e.g., data associated with a particular person).

In one or more embodiments of the invention, the update data specifies how the metadata and/or data associated with the metadata is to be updated (the data may be included in one or more data chunks). The update data may specify how the metadata and/or associated metadata should be upon update completion. For example, the update data may specify that all object level metadata in a region should include particular geolocation information. In another example, the update data may specify new contents for one or more data chunks.

In step 504, the metadata characteristic is matched to a portion of object level metadata and/or chunk level metadata to identify an implicated metadata portion.

In one or more embodiments of the invention, the metadata characteristic is matched by comparing the metadata characteristic to the chunk level metadata and/or the object level metadata. A match may be determined based on the comparison. The match portion may include any amount (e.g., none, a small amount, a large amount, etc.) of chunk level metadata and/or the object level metadata.

In one or more embodiments of the invention, the match is performed via the method illustrated in FIG. 5.2. The match may be performed via other methods without departing from the invention.

In step 506, the implicated metadata portion and/or data chunks associated with the implicated metadata portion are modified based on the update data.

In one or more embodiments of the invention, the implicated metadata portion is updated by adding the update data to the implicated metadata portion.

In one or more embodiments of the invention, the implicated metadata portion is updated by modifying a portion of the implicated metadata portion based on the update data. For example, the portion of the implicated metadata portion may be replaced by the update data. In another example, the portion of the implicated metadata portion may be deleted based on the update data.

In one or more embodiments of the invention, the data chunks associated with the implicated metadata portion is updated by adding the update data to the data chunks. For example, new data chunks may be added that have contents based on the update data.

In one or more embodiments of the invention, the data chunks associated with the implicated metadata portion is updated by modifying a portion of the contents of the data chunks. For example, the contents of the data chunks may be modified based on the update data. In another example, the contents of the data chunks and/or the data chunks may be deleted based on the update data.

The implicated metadata portion and/or the data chunks associated with the implicated metadata portion may be modified via the method illustrated in FIG. 5.4. The implicated metadata portion and/or the data chunks associated with the implicated metadata portion may be modified via other methods without departing from the invention.

The method may end following step 506.

As noted above, a method illustrated in FIG. 5.2 may be performed to match the metadata characteristic to a portion of metadata. FIG. 5.2 shows a flowchart of a method in accordance with one or more embodiments of the invention. The method depicted in FIG. 5.2 may be used to metadata characteristic to a portion of metadata in accordance with one or more embodiments of the invention. The method shown in FIG. 5.2 may be performed by, for example, a data storage system (e.g., 104, FIG. 1.1). Other components of the system illustrated in FIG. 1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a portion of regions that each store at least a portion of the implicated metadata is identified.

In one or more embodiments of the invention, the portion of the regions is identified by matching a dimension of the metadata characteristic of step 500 of FIG. 5.1 to an identifier of a computing resource aggregation and/or region. For example, as discussed above, the metadata characteristic may specify storage locations and/or regions (e.g., when information regarding data from a particular location/region is desired). The portion of the regions may be identified by matching the identifiers specified by the metadata characteristic to corresponding regions of the portion of the regions. To do so, object level metadata may be searched to identify the matching regions.

In step 512, sub-requests for respective regions of the portion of the regions are generated based on the update request.

The sub-requests for the respective regions may be generated by limiting the number of dimensions of the metadata characteristic specified by the update request to metadata characteristics that are relevant for each of the respective regions. For example, if an update request specifies a metadata characteristic that indicates that only a computing resource aggregation in a single region is likely to include responsive data (e.g., by specifying that only the data/metadata in the computing resource aggregation is to be considered when formulating a response to the update request by including, for example, an identifier of the computing resource aggregation in the metadata characteristic), only a sub-request for the region that includes the computing resource aggregation may be generated.

In step 514, the sub-requests are distributed to regional enumerators in respective regions of the portion of the regions.

In one or more embodiments of the invention, the sub-requests are distributed by sending copies of the sub-requests to the regional enumerators via corresponding messages.

In step 516, responses to the sub-requests are aggregated. The responses may include, for example, an indication the sub-request has been completed. The aggregated responses may be used to generate a response to the update request.

The method may end following step 516.

The methods illustrated in FIGS. 5.1-5.2 may be performed, for example, by a global enumerator. In some embodiments of the invention, the methods performed in FIGS. 5.1-5.2 may be performed by an instance of a regional enumerator that is acting as both a regional enumerator and a global enumerator. By performing the methods illustrated in FIGS. 5.1-5.2, a system in accordance with embodiments of the invention may efficiently respond to update requests by utilizing object level metadata and/or chunk level metadata to generate responses to update requests rather than by crawling data or employing more computationally expensive methods of servicing update requests.

As discussed above, sub-requests may be serviced by regional enumerators. FIG. 5.3 shows a flowchart of a method in accordance with one or more embodiments of the invention. The method depicted in FIG. 5.3 may be used to service a sub-request in accordance with one or more embodiments of the invention. The method shown in FIG. 5.3 may be performed by, for example, a data storage system (e.g., 104, FIG. 1.1). Other components of the system illustrated in FIG. 1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 520, a sub-request is obtained.

In one or more embodiments of the invention, the sub-request is obtained from a global enumerator. The sub-request may specify one or more metadata characteristics and update data. The one or more metadata characteristics may correspond to, for example, information that is included in object level metadata and/or chunk level metadata. The update data may specify how data and/or metadata are to be modified when the sub-request is serviced.

In step 522, copies of the sub-request are distributed to a portion of the storages in a region. The portion of the storages may include data and/or metadata that are likely to be responsive to the sub-request.

To identify the portion of the storages, object level metadata and/or chunk level metadata may be matched to one or more of the metadata characteristics. Copies of the sub-request may be distributed to only the storages corresponding to the matched object level metadata and/or chunk level metadata. By doing so, only a subset of all of the storages in a region may receive sub-requests. Consequently, only storages that are likely to include responsive data and/or metadata may be encumbered with processing of the sub-requests.

For example, the regional enumerator of each region may have access to a cached (i.e., in memory data structure) version of object level metadata associated with data chunks in a region. The metadata characteristics may be matched to the object level metadata to determine whether any of the data chunks and/or metadata in each of the storages is likely to be responsive to a sub-request. Sub-requests may be distributed to each of the storages corresponding to the matched metadata.

In step 524, the responses to the copies of the sub-requests are aggregated. For example, each of the storages that receives a copy of the sub-request may generate a response that indicates whether the sub-request has been completed. The response may specify other types of information without departing from the invention. The responses may be provided to regional enumerators of the corresponding regions.

In step 526, the aggregated responses to the copies of the sub-request are provided in response to the sub-request. For example, the responses may be combined into a single response that includes the information included in each of the responses to the copies of the sub-request. The response may deduplicate information that is duplicative in the responses to the sub-request obtained from the storages.

The method may end following step 526.

The method illustrated in FIG. 5.3 may be performed by regional enumerators. When performing the methods illustrate din FIG. 5.3, the regional enumerators may distribute sub-requests to computing resource aggregations and/or directly to storages included in each of the computing resource aggregations. For example, storage managers of each of the computing resource aggregations may distribute sub-requests received from a regional enumerator.

For example, in a scenario in which three computing clusters are disposed in a region, a regional enumerator may distribute sub-requests to each of the computing clusters. In turn the computing clusters may distribute copies of the sub-requests to each of the storages (or storage managers) hosted by the sub-requests. Each of the storages (or storage managers) may independently process the sub-requests in accordance with their individual workloads. By doing so, a data storage system in accordance with embodiments of the invention may provide a distributed method of addressing data access requests across any number of regions. Processing of the sub-requests may be performed asynchronously and, consequently, may be efficiently processed by each of the regions separately from the other regions.

As discussed above, copies of sub-requests may be serviced by individual storages and/or storage controllers of each computing device aggregation. FIG. 5.4 shows a flowchart of a method in accordance with one or more embodiments of the invention. The method depicted in FIG. 5.4 may be used to service a copy of a sub-request in accordance with one or more embodiments of the invention. The method shown in FIG. 5.4 may be performed by, for example, a data storage system (e.g., 104, FIG. 1.1). Other components of the system illustrated in FIG. 1 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

In step 530, a copy of a sub-request is obtained. The copy of the sub-request may be obtained from a regional enumerator. The copy of the sub-request may be obtained from a storage manager. The copy of the sub-request may be obtained from other entities without departing from the invention.

For example, a regional enumerator may send a copy of the sub-request to a storage when servicing a sub-request. The sub-request may be included in a message sent to the storage by the regional enumerator.

In step 532, a metadata characteristic specified by the copy of the sub-request is matched to a portion of object level metadata and/or chunk level metadata.

As discussed above, sub-requests (and copies thereof) may specify uni-dimensional or multi-dimensional metadata characteristic. Portions of the metadata characteristic may match different portions of the object level metadata and/or the chunk level metadata.

For example, the metadata characteristic may specify a type of an organization. Similarly, object level metadata may specify an organization type for objects stored in the storage. The type of the organization may be compared to various portions of the object level metadata associated with corresponding objects to determine whether the metadata characteristic matches one or more of the portions of the object level metadata. Any such portions of the object level metadata that specify the same organization type, as specified by the metadata characteristic, may be considered to be matches.

In Step 534, the matched metadata and/or data chunks associated with the matched metadata are modified based on the update data. The update data may specify changes to be made to the aforementioned data chunks and/or metadata. The data chunks and/or matched metadata may be modified based on the specified changes.

Modifying the matched metadata and/or associated data chunks may include modifying all, or a portion, of the contents of the metadata and/or modifying all, or a portion of the contents of the data chunks associated with the matched metadata.

For example, modifying the matched metadata may include replacing the matched metadata with data included in and/or specified by the update data. In another example, modifying the data chunks associated with the matched metadata may include replacing the data chunks with data included in and/or specified by the update data. The matched metadata and/or associated data chunks may be modified via other methods without departing from the invention.

The method may end following step 534.

The method illustrated in FIG. 5.4 may be performed asynchronously by any number of storage managers and/or storages without departing from the invention. For example, different storages may perform the same method at different points in time, at different rates, and/or otherwise in different manners in accordance with computing resource limitations of each of the aforementioned storages.

As discussed above, when responding to update requests, a system in accordance with embodiments of the invention may utilize object level metadata and/or chunk level metadata to service the update requests without resorting to crawling of data or other computationally expensive methods of crawling data. To do so, the system may generate object level metadata and/or chunk level metadata while storing data in the system. FIG. 5.5 shows a flowchart of a method in accordance with one or more embodiments of the invention. The method depicted in FIG. 5.5 may be used to store data in a data storage system in accordance with one or more embodiments of the invention. The method shown in FIG. 5.5 may be performed by, for example, a data storage system (e.g., 104, FIG. 1.1). Other components of the system illustrated in FIG. 1 may perform all, or a portion, of the method of FIG. 5.5 without departing from the invention.

While FIG. 5.5 is illustrated as a series of steps, any of the steps may be omitted, performed in a different order, additional steps may be included, and/or any or all of the steps may be performed in a parallel and/or partially overlapping manner without departing from the invention.

In step 540, data is obtained for storage.

In one or more embodiments of the invention, the data is obtained from a client. The data may include any quantity and/or type of data. For example, the data may include data (e.g., an object) corresponding to an object and metadata used by a file system for organization purposes.

In one or more embodiments of the invention, the data may be provided to the data storage system by a client. For example, the data may be sent to the data storage system from the client via an operable connection between the data storage system and the client.

In step 542, an object of the data is data integrity coded to obtain data chunks corresponding to the object. The data chunks may be data integrity coded data.

For example, the data may be integrity coded by erasure coding the data. Other types of data integrity algorithms may be used to encode the data without departing from the invention.

In one or more embodiments of the invention, the object of the data is a logical portion of data. For example, the logical portion of the data may correspond to a portion specified by an organization framework (e.g., a file system) used by a client to store the object prior to providing the data to the data storage system for storage.

In step 544, object level metadata for the object is obtained. The object level metadata may include information regarding the object. For example, the object level metadata may be derived from system-level metadata associated with the object. The object level metadata may also include other information regarding the object beyond that of system-level metadata. For example, the object level metadata may include classification information, access restrictions, and/or other information that may be utilized to restrict and/or control access to the object. Such information may be obtained via any method without departing from the invention.

In step 546, chunk level metadata for each of the data chunks is obtained. The chunk level metadata may include information regarding a corresponding data chunk. The chunk level metadata may include information derived from system-level metadata associated with an object that includes the data of the data chunk. The chunk level metadata may also include, for example, classification information regarding jurisdictional data access regulations, personal information, data access restrictions, and/or any other type of information that may be useful to discriminate the data chunk from other data chunks.

When generating the object level metadata and/or chunk level metadata, any type of algorithm may be used to data mine the corresponding data for relevant information regarding the metadata that should be generated for each of the data chunks. For example, algorithms designed to detect the presence of personal information (or other types of information that may be subject to data access/control restrictions) or other information that indicates that special precautions must be taken to manage the data included in the data chunks and/or objects. The metadata (i.e., object level and/or chunk level) may include relevant information based on such analysis of the data.

In step 548, the data chunks, the object level metadata, and the chunk level metadata is stored. For example, the data chunks may be distributed across any number of storage devices in accordance with fault domain restrictions imposed by a data integrity algorithm used to encode the data to obtain the data chunks. The object level metadata and/or the chunk level metadata may be stored along with the data chunks and/or in other locations. For example, the metadata may be stored separately from the data to improve the searchability of the metadata.

Any number of copies of the data chunks and metadata may be stored in any number of locations without departing from the invention. For example, copies of the metadata may be stored in a regional-level (i.e., in a repository reflecting all metadata of a region), in a computing resources aggregation level, and/or at a storage level. In contrast, copies of the data chunks may only be stored at a storage level.

By doing so, the metadata may be stored in a highly searchable manner that facilitates computational efficient searching of the metadata at different levels of granularity while copies of the data chunks may be stored in a reliable level at a storage level.

The method may end following step 548.

Thus, via the method illustrated in FIG. 5.5, metadata may be generated and/or stored in a manner that facilitates efficient searching of the data chunks. Further, because the data chunks are stored in a form that includes data integrity information, the data included in the data chunks may not be stored in an easily searchable form via direct searching of the data included in the data chunks.

As discussed above, the object level metadata and/or chunk level metadata may be used to selectively modify the metadata and/or corresponding data. Such modifications may be used to meet various goals such as, for example, meeting data regulatory requirements by governments. FIGS. 5.6-5.7 show flowcharts of methods that may be used to modify data and/or metadata in a data storage system to meet such requirements and/or other types of goals.

FIG. 5.6 shows a flowchart of a method in accordance with one or more embodiments of the invention. The method depicted in FIG. 5.6 may be used to enforce compliance with data regulations in accordance with one or more embodiments of the invention. The method shown in FIG. 5.6 may be performed by, for example, a data storage system (e.g., 104, FIG. 1.1). Other components of the system illustrated in FIG. 1 may perform all, or a portion, of the method of FIG. 5.6 without departing from the invention.

While FIG. 5.6 is illustrated as a series of steps, any of the steps may be omitted, performed in a different order, additional steps may be included, and/or any or all of the steps may be performed in a parallel and/or partially overlapping manner without departing from the invention.

In step 550, a data regulation compliance analysis of data stored in at least two regions of a data storage system is performed to identify at least one noncompliant region.

In one or more embodiments of the invention, the data regulation compliance analysis is performed by comparing the data stored in the data storage system with data regulations. The data regulations may be reflected by data regulation policies (e.g., 419, FIG. 4.1). The data regulation policies may specify any number of requirements of data stored in the data storage system. If any portion of data in a region fails to meet the requirements of the data regulation policies, the region may be determined to be a noncompliant region.

For example, consider a scenario in which the data regulation policies specify that personal information may not be stored in a region. To determine whether the region is noncompliant, the data storage system may search the object level metadata and/or chunk level metadata in the region to determine if any classification information specified by the object level metadata in the region indicates that personal information is included in any data chunks corresponding to the metadata. If the search indicates that the data chunks corresponding to the metadata includes personal information, the region may be deemed to be noncompliant. The search may be performed similarly to the searching object level metadata via generation of sub-requests as discussed with respect to FIGS. 5.1-5.3.

In step 552, a portion of the data stored in the noncompliant region that is noncompliant is identified. The portion of the data may correspond to the data chunks associated with the metadata that was found to indicate that the corresponding data chunks were noncompliant, as discussed with respect to step 550.

For example, when metadata indicates that data is noncompliant, the metadata may be associated with any number of data chunks. For example, if object metadata indicates that data is noncompliant, the object metadata may include identifiers (or other types of identification information) of data chunks associated with an object. The identified data chunks may include all, or a portion, of noncompliant data as indicated by the object level metadata. In another example, if chunk level metadata indicates that data is noncompliant, the chunk level metadata may include an identifier (or another type of identification information) of a data chunk associated with the chunk level metadata.

In Step 554, the portion of the data is removed from the noncompliant region.

The portion of the data may be removed from the noncompliant region by, for example, sending an update request (as discussed with respect to FIG. 5.1) indicating that the portion of the data is to be removed. The update request may, for example, include a metadata characteristic of an identifier of the region and/or an identifier of an object that includes the portion of the data to enable an enumerator to discriminate the portion of the data from other data stored in the data storage system. The update request may also include update data associated with the object is to be deleted.

In one or more embodiments of the invention, the update request may be processed by the data storage system via the method illustrated in FIG. 5.1.

The method may end following step 554.

FIG. 5.7 shows a flowchart of a method in accordance with one or more embodiments of the invention. The method depicted in FIG. 5.7 may be used to service a data control analysis in accordance with one or more embodiments of the invention. The method shown in FIG. 5.7 may be performed by, for example, a data storage system (e.g., 104, FIG. 1.1). Other components of the system illustrated in FIG. 1 may perform all, or a portion, of the method of FIG. 5.7 without departing from the invention.

While FIG. 5.7 is illustrated as a series of steps, any of the steps may be omitted, performed in a different order, additional steps may be included, and/or any or all of the steps may be performed in a parallel and/or partially overlapping manner without departing from the invention.

In step 560, a data control analysis of data replicated to multiple regions is performed to identify at least one high regulation region and one low regulation region.

In one or more embodiments of the invention, the data control analysis may be performed by identifying requirements, specified by data regulation policies, for each region with respect to data stored in the regions. The requirements may be aggregated for each region to identify the particular requirements to which data stored in each of the regions must meet. The aggregated requirements may indicate which of the regions are high regulation regions and which of the regions are low regulation regions. For example, different regions may have more restrictions than other regions.

A high regulation region may be one that imposes restrictions on accessing and/or modifying data in the region. For example, the aggregated requirements for some regions may include generating an audit trail for the region. In contrast, the aggregated requirements may not require that an audit trail be generated for the other regions. Consequently, the other regions may be considered low regulation regions.

In step 562, first metadata, stored in the high regulation region, associated with the data is updated to regulate access to a copy of the data stored in the high regulation region. The update may be performed by generating an update request. The update request may be processed via the method illustrated in FIG. 5.1.

By updating the first metadata, the copy of the data stored in the high regulation region may be subject to an audit trail, may have access restrictions (e.g., may be made unmodifiable), or may otherwise be regulated at a high degree than a copy of the data stored in the low regulation region.

The metadata may be updated by, for example, modifying a portion of object level metadata and/or chunk level metadata associated with data chunks that stores the copy of the data. For example, the object level metadata may be modified to indicate that an audit trail is to be generated, that only a limited number of users may access/modify/delete the copy of the data, and/or place other type of limitations on use of the copy of the data.

In step 564, second metadata, stored in the low regulation region, associated with the data is updated to deregulate access to a second copy of the data stored in the low regulation region. The update may be performed by generating an update request. The update request may be processed via the method illustrated in FIG. 5.1.

By updating the second metadata, the second copy of the data stored in the low regulation region may not be subject to an audit trail, may not have access restrictions (e.g., may be made unmodifiable), or may otherwise be regulated at a lower degree than the copy of the data stored in the high regulation region.

The second metadata may be updated by, for example, modifying a portion of object level metadata and/or chunk level metadata associated with data chunks that stores the second copy of the data. For example, the portion of the object level metadata may be modified to indicate that an audit trail should not be generated, that any entity may access/modify/delete the copy of the data, and/or other types of limitations on use of the second copy of the data may be removed if they were present before updating the second metadata.

The method may end following step 564.

Via the methods illustrated in FIGS. 5.6-5.7, a system in accordance with embodiments of the invention may enable data regulation policies to be granularly enforced at a regional level.

To further clarify embodiments of the invention, a non-limiting example is provided in FIGS. 6.1-6.7. Each of these figures may illustrate a system similar to that of FIG. 1 at different points in times. For the sake of brevity, only a limited number of components of the system of FIG. 1 are illustrated in each of FIGS. 6.1-6.7.

EXAMPLE

Consider a scenario as illustrated in FIG. 6.1 in which a data storage system (610) includes a first region (620) that is located in the USA and a second region (630) that is located in Europe. The data storage system (610) provides data management services for a client (600) that does not have any data regulation policies (640) but includes a data redundancy policy (642) that requires data from the first region (620) to be replicated in the second region (630).

At a first point in time, the client (600) sends a customer data storage request (602) to the data storage system (610).

Specifically, the customer data storage request (602) is sent to the first region (620) because the client (600) is also located in the USA.

Upon receipt of the customer data storage request (602), the first region stores object level metadata (622), a first data chunk (624), and a second data chunk (626) as illustrated in FIG. 6.2. The first data chunk (624) includes a customer name and the second data chunk (626) includes a customer address. The object level metadata (622) does not include any restrictions based on the data regulation policies (640) but does indicate that personal information is included in the data chunks (624, 626) which are associated with the object level metadata and that the data is stored in Europe.

After metadata and data are stored, the data storage system (610) replicates the data and metadata to the second region (630) as illustrated in FIG. 6.3. Specifically, a copy of the object level metadata (632), first data chunk (634), and the second data chunk (636) are stored in the second region (630) in accordance with the data redundancy policy. In contrast to the object level metadata stored in the first region (620), the object level metadata (632) stored in the second region (630) indicates that the data is stored in Europe.

After the copy of the data and metadata are stored in the second region, the client (600) changes its data regulation policies as illustrated in FIG. 6.4 to require that no personal information be stored in Europe. Once the data regulation policies (640) are updated, the client (600) initiates a data regulation compliance analysis (604).

In response to initiation of the data regulation compliance analysis, the data storage system (610) analyses the data regulation policies (640) and determines that no personal information may be stored in Europe. To enforce the determinations made via the data compliance analysis, an enumerator (not shown) of the data storage system (610) generates an update request that specifies Europe and personal information as metadata criteria and deletion as the update data.

The enumerator then processes the update request by generating a sub-request for the second region (630). The sub-request is sent to a regional enumerator (not shown) of the second region which processes the sub-request. To process the sub-request, the regional enumerator deletes the first data chunk (634) and the second data chunk (636) stored in the second region (630), as illustrated in FIG. 6.5.

At a third point in time, as illustrated in FIG. 6.6, the client (600) sends a customer information search request (606) to the data storage system (610) that requests information regarding the customer of the customer data storage request (602). More specifically, the global enumerator obtains the customer information search request (606).

In response to obtaining the customer information search request (606), the global enumerator generates sub-requests for each of the first region and the second region because the object level metadata (622, 632) in each region indicates that each region is likely to include data responsive to the customer information search request (606).

Once generated, the sub-requests are provided to the first region (620) and the second region (630) for processing. However, at the time the sub-requests are provided to the regions, the first region (620) is under a heavy work load while the second region (630) is under a light workload. Consequently, the second region (630) is able to search the object level metadata (632) stored in the second region (630) prior to the first region (620) being able to service its sub-request. Consequently, as illustrated in FIG. 6.7, the second region (630) generates and provides a responsive search request response (608) based only on the contents of the object level metadata (632) stored in the second region (630).

End of Example

Thus, via the methods illustrated in FIGS. 6.1-6.7, embodiments of the invention may provide a method for meeting data compliance goals such as, for example, meeting regulatory environments.

Figure 7:
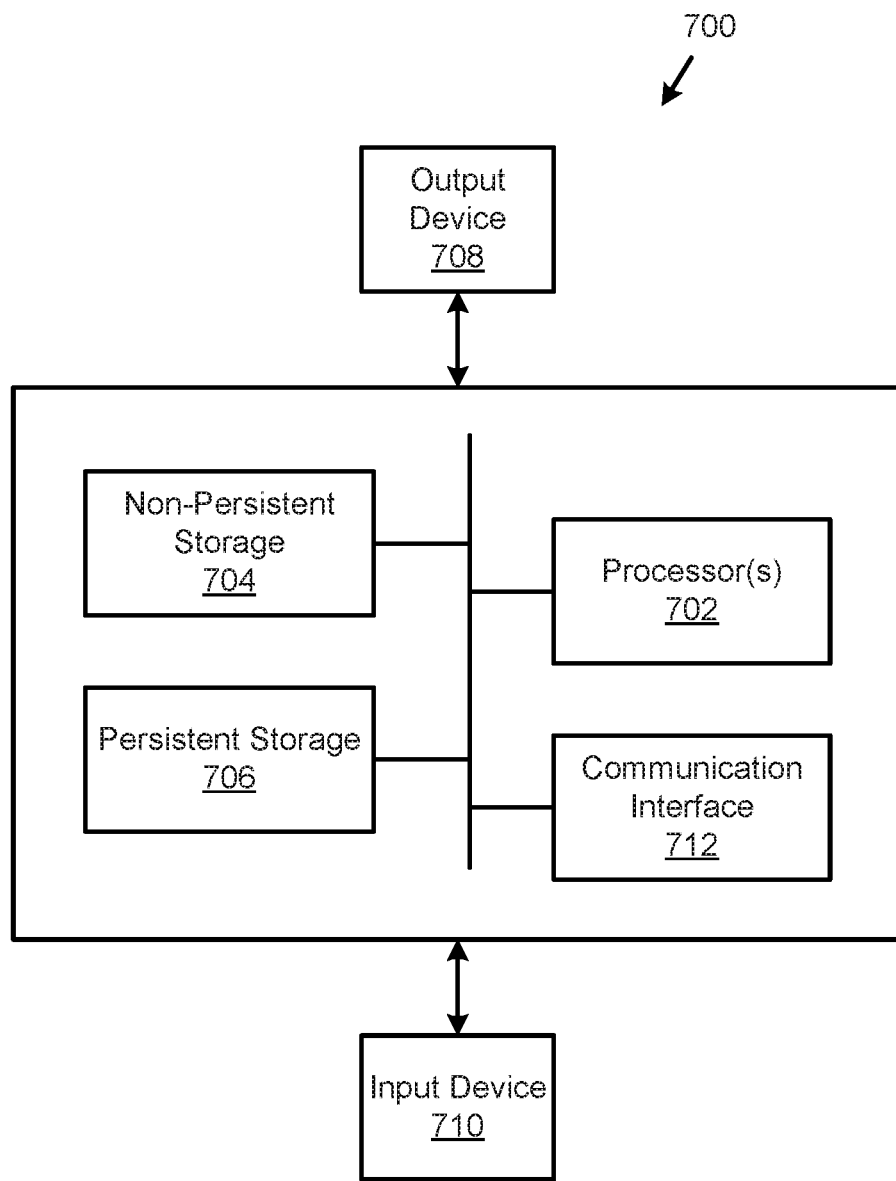
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a computationally efficient method for managing data in a data storage system. For example, embodiments of the invention may provide a method for identifying whether data stored in a data management system fails to meet governmental regulations or other goals set by an organization. To make the determination, embodiments of the invention may provide a method of searching metadata for characteristics of associated data that is unlikely to meet goals set by the organization. Searching the metadata, rather than the data itself, may be more computationally efficiently. Consequently, a system in accordance with embodiments of the invention may be able to provide an improved method for managing data when compared to contemporary data management systems that utilize direct searching of the data for management purposes.

Thus, embodiments of the invention may address the problem of management of data in a distributed system. By utilizing metadata to determine whether data meets organizational goals, embodiments of the invention may improve the ability of a system to manage data in a manner than is more computationally efficient.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage system, comprising:
a first region comprising a first physical storage device for storing a first copy of data;
a second region comprising a second physical storage device for storing a second copy of the data;
a processor comprising circuitry;
memory; and
a global enumerator, executing using the processor and the memory, and programmed to:
perform a data control analysis of the data, using a plurality of requirements specified in a plurality of data regulation policies, to identify that the first region is a high regulation region and the second region is a low regulation region based at least in part on the plurality of data regulation policies specifying more restrictions for the first region than for the second region;
in response to making the identification:
update first metadata associated with the first copy of the data to regulate access to the first copy of the data, wherein:
the first metadata is updated by sending a first update request to cause a first modification of at least a portion of the first metadata to add a first data access requirement for accessing the first copy of the data; and
update second metadata associated with the second copy of the data to deregulate access to the second copy of the data, wherein:
the second metadata is updated by sending a second update request to cause a second modification of at least a portion of the second metadata to remove a second data access requirement for accessing the second copy of the data.

2. The data storage system of claim 1, wherein the first copy of the data is stored as a first plurality of data chunks and the second copy of the data is stored as a second plurality of data chunks.

3. The data storage system of claim 2, wherein the first metadata comprises:
first object level metadata associated with the first plurality of data chunks, and
first chunk level metadata associated with respective data chunks of the first plurality of data chunks.

4. The data storage system of claim 1, wherein updating the first metadata comprises:
modifying object level metadata associated with the first copy of the data to indicate that an audit trail for the first copy of the data is to be generated.

5. The data storage system of claim 4, wherein updating the second metadata comprises:
modifying object level metadata associated with the second copy of the data to indicate that an audit trail for the second copy of the data is not to be generated.

6. The data storage system of claim 1, wherein updating the first metadata comprises:
modifying object level metadata associated with the first copy of the data to indicate that access to the first copy of the data is restricted.

7. The data storage system of claim 6, wherein updating the second metadata comprises:
modifying object level metadata associated with the second copy of the data to indicate that access to the second copy of the data is unrestricted.

8. The data storage system of claim 1, wherein the global enumerator is further programmed to:
perform a data regulation compliance analysis of the data to identify that the second region is a noncompliant region;
in response to identifying that the second region is the noncompliant region:
identify a portion of the second copy of the data that is out of compliance with data regulation policies; and
remove the portion of the second copy of the data while retaining object level metadata and chunk level metadata associated with the portion of the second copy of the data.

9. The data storage system of claim 8, wherein removing the portion of the second copy of the data comprises:
identifying a plurality of data chunks associated with the portion of the second copy of the data; and
deleting the plurality of the data chunks.

10. The data storage system of claim 9, wherein performing the data regulation compliance analysis comprises:
identifying, using the object level metadata, a geographic location in which a storage that stores the plurality of data chunks resides; and
comparing the geographic location to data regulation policies that specify where the data is allowed to be stored.

11. A method for managing a data storage system, comprising:
performing a data control analysis of data, using a plurality of requirements specified in a plurality of data regulation policies, to identify that a first region is a high regulation region and a second region is a low regulation region based at least in part on the plurality of data regulation policies specifying more restrictions for the first region than for the second region, wherein the first region stores a first copy of the data and the second region stores a second copy of the data; and
in response to making the identification:
updating first metadata associated with the first copy of the data to regulate access to the first copy of the data, wherein:
the first metadata is updated by sending a first update request to cause a first modification of at least a portion of the first metadata to add a first data access requirement for accessing the first copy of the data; and updating second metadata associated with the second copy of the data to deregulate access to the second copy of the data, wherein:
the second metadata is updated by sending a second update request to cause a second modification of at least a portion of the second metadata to remove a second data access requirement for accessing the second copy of the data.

12. The method of claim 11, wherein the first copy of the data is stored as a first plurality of data chunks and the second copy of the data is stored as a second plurality of data chunks.

13. The method of claim 12, wherein the first metadata comprises:
first object level metadata associated with the first plurality of data chunks, and
first chunk level metadata associated with respective data chunks of the first plurality of data chunks.

14. The method of claim 11, wherein updating the first metadata comprises:
modifying object level metadata associated with the first copy of the data to indicate that an audit trail for the first copy of the data is to be generated.

15. The method of claim 14, wherein updating the second metadata comprises:
modifying object level metadata associated with the second copy of the data to indicate that an audit trail for the second copy of the data is not to be generated.

16. A non-transitory computer readable medium comprising computer readable program code, which when executed by a computer processor enables the computer processor to perform a method for managing a data storage system, the method comprising:
performing a data control analysis of data, using a plurality of requirements specified in a plurality of data regulation policies, to identify that a first region is a high regulation region and a second region is a low regulation region based at least in part on the plurality of data regulation policies specifying more restrictions for the first region than for the second region, wherein the first region stores a first copy of the data and the second region stores a second copy of the data; and in response to making the identification:
updating first metadata associated with the first copy of the data to regulate access to the first copy of the data, wherein:
the first metadata is updated by sending a first update request to cause a first modification of at least a portion of the first metadata to add a first data access requirement for accessing the first copy of the data; and updating second metadata associated with the second copy of the data to deregulate access to the second copy of the data, wherein:
the second metadata is updated by sending a second update request to cause a second modification of at least a portion of the second metadata to remove a second data access requirement for accessing the second copy of the data.

17. The non-transitory computer readable medium of claim 16, wherein the first copy of the data is stored as a first plurality of data chunks and the second copy of the data is stored as a second plurality of data chunks.

18. The non-transitory computer readable medium of claim 17, wherein the first metadata comprises:
first object level metadata associated with the first plurality of data chunks, and
first chunk level metadata associated with respective data chunks of the first plurality of data chunks.

19. The non-transitory computer readable medium of claim 16, wherein updating the first metadata comprises:
modifying object level metadata associated with the first copy of the data to indicate that an audit trail for the first copy of the data is to be generated.

20. The non-transitory computer readable medium of claim 19, wherein updating the second metadata comprises:
modifying object level metadata associated with the second copy of the data to indicate that an audit trail for the second copy of the data is not to be generated.

* * * * *